(12) United States Patent
Tanaka et al.

(10) Patent No.: US 9,467,318 B2
(45) Date of Patent: Oct. 11, 2016

(54) COMMUNICATION SYSTEM, RECEIVING DEVICE, AND SEMICONDUCTOR DEVICE

(71) Applicant: FUJITSU LIMITED, Kawasaki-shi, Kanagawa (JP)

(72) Inventors: Daijiro Tanaka, Fuchu (JP); Yohei Koganei, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/671,221

(22) Filed: Mar. 27, 2015

(65) Prior Publication Data

US 2015/0295740 A1   Oct. 15, 2015

(30) Foreign Application Priority Data

Apr. 15, 2014   (JP) ................ 2014-084043

(51) Int. Cl.
  *H04L 5/12*     (2006.01)
  *H04L 27/227*   (2006.01)
  *H04B 10/516*   (2013.01)
  *H04B 10/61*    (2013.01)

(52) U.S. Cl.
  CPC ......... *H04L 27/2275* (2013.01); *H04B 10/516* (2013.01); *H04B 10/6165* (2013.01); *H04L 27/2273* (2013.01)

(58) Field of Classification Search
  CPC ............... H04L 27/2647; H04L 2025/03414; H04L 2025/0342; H04L 27/2601; H04L 27/18; H04L 27/22; H04L 27/227; H04L 27/2273; H04L 27/2275; H04L 27/3427; H04L 27/3818; H04L 7/08; H04L 27/3444; H04L 27/03

USPC ....... 375/260, 261, 308, 279, 354, 298, 326, 375/329, 349, 371, 269, 226, 324; 329/304; 398/188

See application file for complete search history.

(56) References Cited

U.S. PATENT DOCUMENTS

| | | | |
|---|---|---|---|
| 2010/0138722 A1 | 6/2010 | Harley et al. | |
| 2013/0089342 A1* | 4/2013 | Oveis Gharan | H04B 10/6165 398/208 |
| 2014/0003555 A1 | 1/2014 | Shigihara et al. | |

FOREIGN PATENT DOCUMENTS

| WO | WO 2010/063092 A1 | 6/2010 |
|---|---|---|
| WO | WO 2012/132103 A1 | 10/2012 |

* cited by examiner

*Primary Examiner* — Rahel Guarino
(74) *Attorney, Agent, or Firm* — Staas & Halsey LLP

(57) ABSTRACT

A communication system includes a transmitting device that transmits a signal based on pluralities of symbol coordinates on a constellation and pluralities of trajectory coordinates between respective ones of the pluralities of symbol coordinates, average coordinates of the pluralities of trajectory coordinates being different coordinates from coordinates of origin, and a receiving device that accumulates pluralities of trajectory coordinates between respective ones of the pluralities of symbol coordinates on the constellation in the signal received from the transmitting device, and estimates a phase of the signal received from the transmitting device based on a value representing a difference between average coordinates of the pluralities of trajectory coordinates accumulated and the different coordinates.

9 Claims, 23 Drawing Sheets

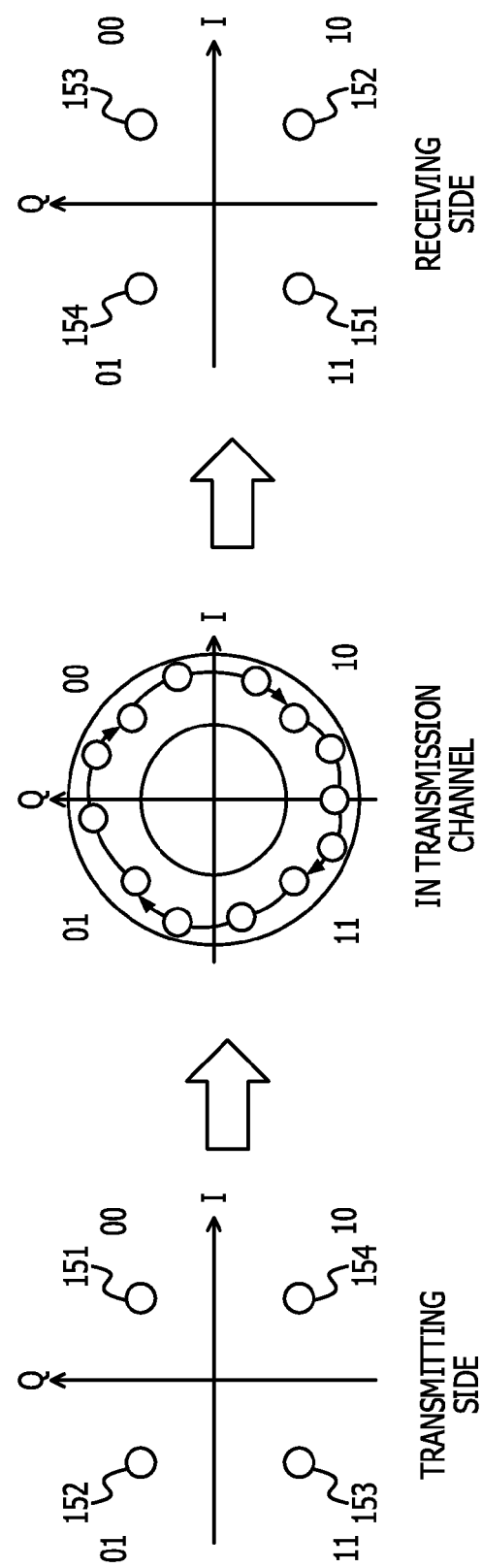

FIG. 5
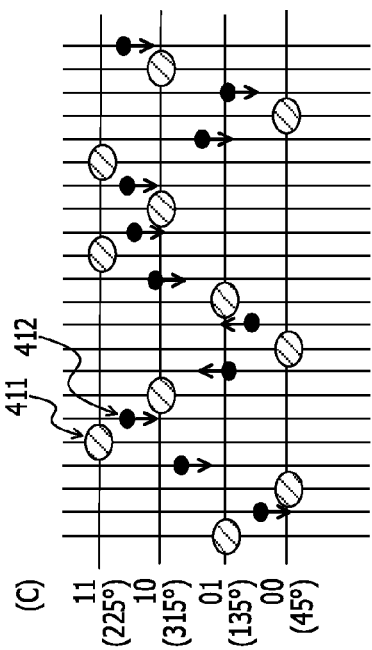
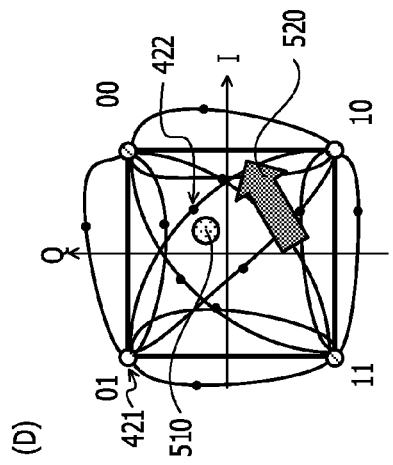
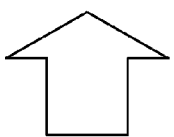
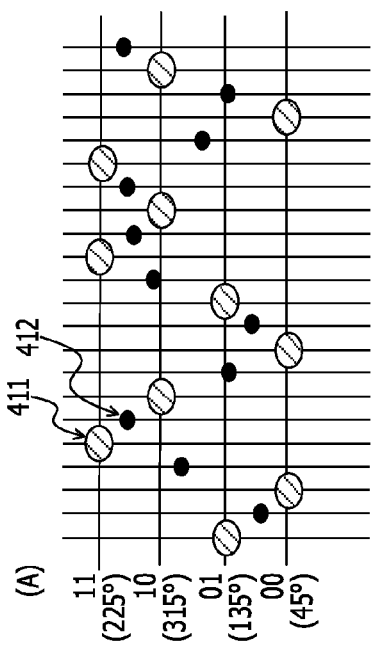
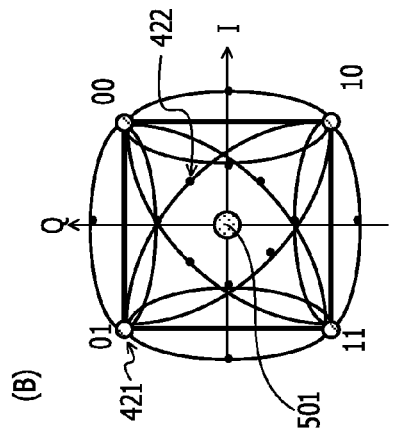

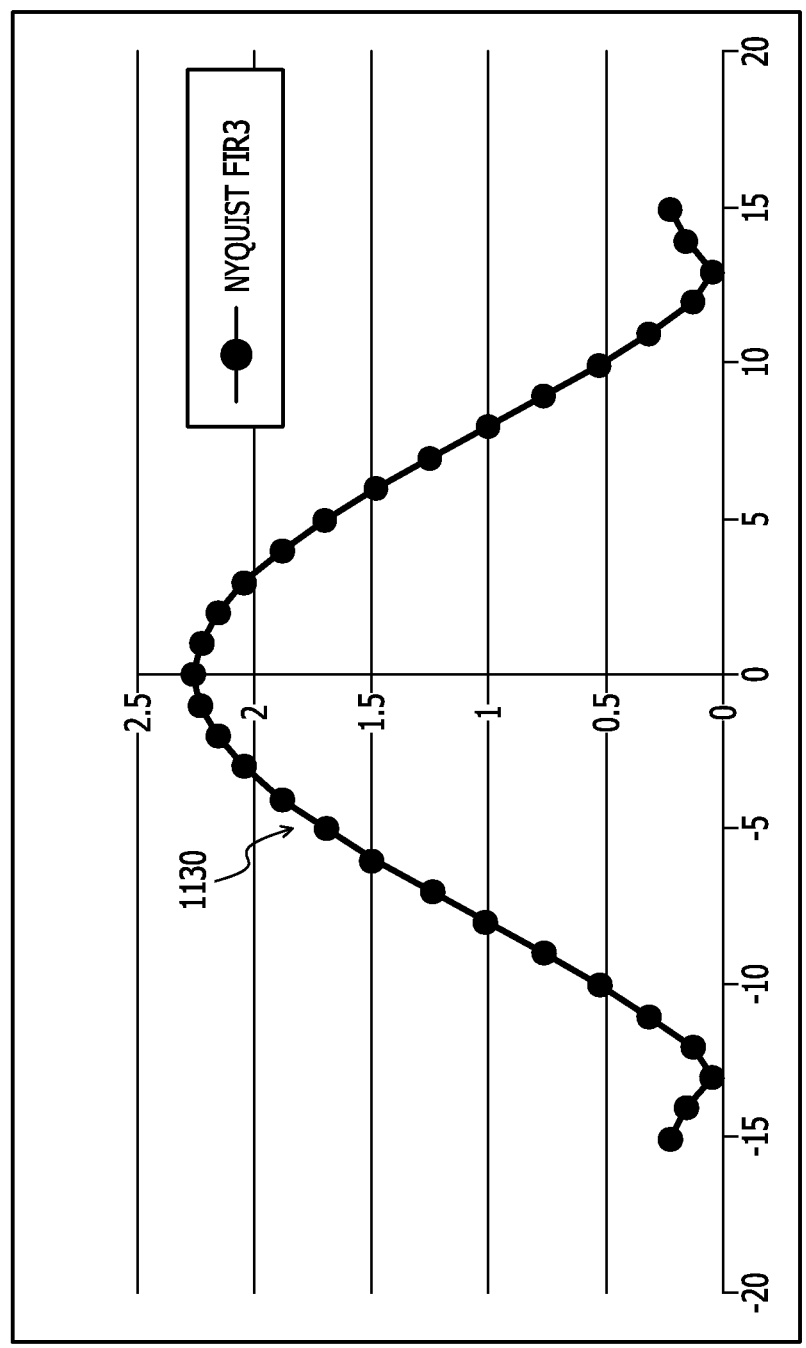

COMMUNICATION SYSTEM, RECEIVING DEVICE, AND SEMICONDUCTOR DEVICE

CROSS-REFERENCE TO RELATED APPLICATION

This application is based upon and claims the benefit of priority of the prior Japanese Patent Application No. 2014-084043, filed on Apr. 15, 2014, the entire contents of which are incorporated herein by reference.

FIELD

The embodiment discussed herein is related to a communication system, a receiving device, and a semiconductor device.

BACKGROUND

There has been a circuit in which when a phase compensation change amount exceeds a threshold, occurrence of a slip is detected, and, in this case, a phase correction amount calculated from the phase compensation change amount is added to the phase of a signal for which phase deviation is compensated for, so that a phase change caused by the slip is corrected. For example, the circuit is disclosed in International Publication Pamphlet No. WO 2012/132103. There has also been a method in which SYNC bursts are periodically inserted in an optical signal, known signals such as knows bits or codes are embedded between the successive SYNC bursts, and detection of a cycle slip and correction are performed using the known signals on the receiving side. For example, the method is disclosed in International Publication Pamphlet No. WO 2010/063092.

SUMMARY

According to an aspect of the invention, a communication system includes a transmitting device that transmits a signal based on pluralities of symbol coordinates on a constellation and pluralities of trajectory coordinates between respective ones of the pluralities of symbol coordinates, average coordinates of the pluralities of trajectory coordinates being different coordinates from coordinates of origin, and a receiving device that accumulates pluralities of trajectory coordinates between respective ones of the pluralities of symbol coordinates on the constellation in the signal received from the transmitting device, and estimates a phase of the signal received from the transmitting device based on a value representing a difference between average coordinates of the pluralities of trajectory coordinates accumulated and the different coordinates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B is an explanatory representation illustrating an example of s phase slip in QPSK;

FIG. 5 is a diagram illustrating an example of the average coordinates of trajectory coordinates;

FIG. 11C is a diagram illustrating an example of frequency components of a waveform in the case where the number of filter stages is three;

DESCRIPTION OF EMBODIMENT

Hereinafter, an exemplary embodiment of the disclosed technique will be described in detail with reference to the accompanying drawings.

Embodiment

Functional Configuration of Communication System

Figure 1A:
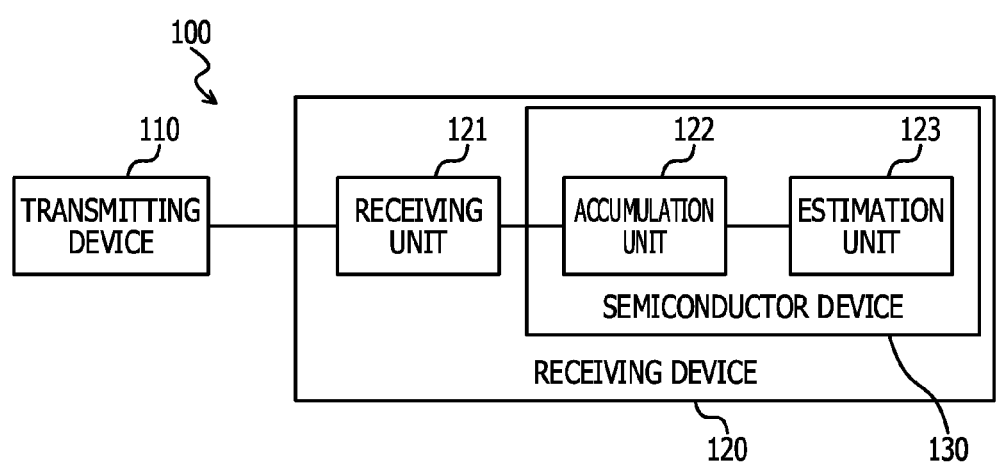
FIG. 1A is a block diagram illustrating an example of a functional configuration of a communication system according to an embodiment.

FIG. 1A is a block diagram illustrating an example of a functional configuration of a communication system according to an embodiment. As illustrated in FIG. 1A, a communication system 100 includes a transmitting device 110 and a receiving device 120. Assuming that the average coordinates of trajectory coordinates between pluralities of symbol coordinates on a constellation are coordinates different from those of the origin, the transmitting device 110 transmits a signal based on the symbol coordinates and the trajectory coordinates to the receiving device 120.

Specifically, the transmitting device 110 transmits a signal based on pluralities of symbol coordinates on a constellation and pluralities of trajectory coordinates between respective ones of the pluralities of symbol coordinates. The average coordinates of the pluralities of trajectory coordinates are coordinates different from those of the origin, which is the point of orthogonal intersection of the I-axis and the Q-axis. A constellation is a diagram in a complex plane, and is specifically a diagram in which the horizontal axis represents the In-phase component and the vertical axis represents the Q-phase component. A symbol arranged on the constellation represents the amplitude and phase of a signal, centered around the origin. The distance from the origin represents an amplitude, and the angle from the origin represents a phase.

Trajectory coordinates are, for example, coordinates obtained by oversampling, and are coordinates between symbol coordinates on a constellation. Trajectory coordinates are, for example, but are not limited to, coordinates of the midpoint between symbol coordinates, and may be coordinates of a point other than the midpoint. The number of points of trajectory coordinates is, but is not limited to, one, and may be plural. Average coordinates are the average of pluralities of trajectory coordinates, and are, for example, barycentric coordinates of the pluralities of trajectory coordinates. In this embodiment, it is assumed that the average coordinates of pluralities of trajectory coordinates are coordinates different from those of the origin. Note that the direction from the origin to the average coordinates of pluralities of trajectory coordinates is referred to as a "reference phase direction".

A signal to be transmitted is a signal produced by modulation including at least phase modulation, and may be a signal produced by modulation including amplitude modulation. A signal to be transmitted is specifically a signal modulated by using phase shift keying or quadrature amplitude modulation. Phase shift keying is, for example, quadrature phase shift keying. Quadrature amplitude modulation is abbreviated as QAM.

The receiving device 120 corrects symbol coordinates, for example, so that the direction of a deviation based on the average coordinates of trajectory coordinates on the constellation for a signal received from the transmitting device 110 is a reference phase direction determined in advance. In this embodiment, the direction of the deviation based on the average coordinates of trajectory coordinates from the origin is referred to as an "estimated phase direction". The reference phase direction is shared between the transmitting device 110 and the receiving device 120. The receiving device 120 therefore corrects symbol coordinates so that the estimated phase direction obtained from the average coordinates of trajectory coordinates in a signal received from the transmitting device 110 is the same direction as the reference phase direction shared with the transmitting device 110.

More specifically, the receiving device 120 includes a receiving unit 121 and a semiconductor device 130. The semiconductor device 130 includes an accumulation unit 122 and an estimation unit 123. The receiving unit 121 receives a signal from the transmitting device 110. The accumulation unit 122 accumulates pluralities of trajectory coordinates for the signal received by the receiving unit 121. Pluralities of trajectory coordinates are coordinates between respective ones of pluralities of symbol coordinates on the constellation. Accumulation is, for example, to store signals in a given period, from the present to the past, or for a given amount in the past in order to obtain the average of trajectory coordinates. The accumulation unit 122 also accumulates pluralities of symbol coordinates for a signal received by the receiving unit 121.

The estimation unit 123 estimates the phase of a signal received from the transmitting device 110 based on a value representing a difference between the average coordinates of pluralities of trajectory coordinates accumulated by the accumulation unit 122 and the average coordinates of pluralities of trajectory coordinates in the transmitting device 110. Hereinbelow, the average coordinates of pluralities of trajectory coordinates accumulated by the accumulation unit 122 are referred to as "receiving average coordinates", and the average coordinates of pluralities of trajectory coordinates in the transmitting device 110 are referred to as "transmitting average coordinates". The direction from the origin to the receiving average coordinates is the estimated phase direction, and the direction from the origin to the transmitting average coordinates is the reference phase direction.

The value representing a difference between the receiving average coordinates and the transmitting average coordinates is, for example, a value based on a result of comparison between the receiving average coordinates and the transmitting average coordinates, and may be represented using angles or directions (vectors) with reference to their respective origins. In addition, the value representing a difference between the receiving average coordinates and the transmitting average coordinates may be a value based on a result of comparison of average coordinates for each given region of pluralities of trajectory coordinates accumulated by the accumulation unit 122.

Each given region is, for example, each quadrant. The value based on a result of comparison of average coordinates for each given region is, for example, a value representing a quadrant having a maximum or minimum distance to the average coordinates. This quadrant is determined from a comparison among average coordinates of the first to fourth quadrants. That is, the receiving device 120 may determine the estimated phase direction by identifying a quadrant having a maximum or minimum distance of the average coordinates from the origin among the first to fourth quadrants.

Assuming that the value representing a difference is a value representing a difference of 180 degrees, for example, the estimation unit 123 may estimate the phase of a signal received from the transmitting device 110 by rotating the pluralities of symbol coordinates accumulated, each by 180 degrees, around the origin of the constellation. Note that rotating of symbol coordinates is not an exclusive way. The phase estimation may be made by rotating coordinate axes.

In the phase estimation performed by the estimation unit 123, a phase estimation circuit included in the estimation unit 123 estimates a phase rotation amount in a signal based on a value representing a difference between the receiving average coordinates and the transmitting average coordinates, and estimates the phase of the signal based on the estimated phase rotation amount and the accumulated symbol coordinates. Additionally, in the phase estimation performed by the estimation unit 123, the estimation unit 123 may correct the phase of a signal estimated by the phase estimation circuit included in the receiving device 120 based on accumulated symbol coordinates, using a value representing a difference between the receiving average coordinates and the transmitting average coordinates.

Distortion of a signal due to an error or the like sometimes results in displacement of the origin serving as a reference point of coordinates on the constellation. To correct this, the accumulation unit 122 accumulates pluralities of symbol coordinates on the constellation for signals received from the transmitting device 110.

In this case, the estimation unit 123 corrects at least either of the receiving average coordinates and the transmitting average coordinates, based on the average coordinates of pluralities of symbol coordinates accumulated by the accumulation unit 122. The average coordinates of pluralities of symbol coordinates accumulated by the estimation unit 123, for example, coincide with the origin in the case where there is no distortion in symbol coordinates, and are displaced from the origin by a distance corresponding to the distortion in the case where there is distortion.

The estimation unit 123 estimates the phase of a signal received from the transmitting device 110 based on a value (value representing a difference) based on a result of comparison between the receiving average coordinates and the transmitting average coordinates at least either of which have been corrected. In other words, the value representing a difference in this case is a value based on a result of comparison between the receiving average coordinates and the transmitting average coordinates at least either of which have been corrected by the estimation unit 123.

For example, the estimation unit 123 corrects only the receiving average coordinates based on the average coordinates of pluralities of symbol coordinates accumulated by the accumulation unit 122. Specifically, the estimation unit 123 corrects only the receiving average coordinates in accordance with a difference between the average coordinates of pluralities of symbol coordinated accumulated by the accumulation unit 122 and the receiving average coordinates. Thus, the displacement of the reference point of coordinates may be removed. Note that the correction is not limited to only the receiving average coordinates. The transmitting average coordinates may be corrected, and both the receiving average coordinates and the transmitting average coordinates may be corrected.

Distortion of a signal due to an error or the like sometimes results in distortion of trajectory coordinates. To correct this, the transmitting device 110 transmits a first signal and a second signal while performing switching between the first signal and the second signal. The first signal is a signal based on pluralities of trajectory coordinates whose average coordinates on the constellation form first coordinates different from the origin (hereinafter referred to as a "first trajectory coordinate group"). The second signal is a signal based on a second trajectory coordinate group where the average coordinates on the constellation form second coordinates different from the origin and the first coordinates.

In this case, the value representing a difference may be a difference based on a third trajectory coordinate group, a fourth trajectory coordinate group, or a difference between the first coordinates and the second coordinates. The third trajectory coordinate group is pluralities of trajectory coordinates between respective ones of pluralities of symbol coordinates for the first signal received from the transmitting device 110. The fourth trajectory coordinate group are pluralities of trajectory coordinates between respective ones of pluralities of symbol coordinates for the second signal received from the transmitting device 110.

Specifically, the value representing a difference is a value representing a difference between the average coordinates of the third trajectory coordinate group and the fourth trajectory coordinate group at least either of which has been corrected based on the difference between the first coordinates and the second coordinates, and the transmitting average coordinates. Between the average coordinates of the third trajectory coordinate group and the fourth trajectory coordinate group, only the average coordinates of the fourth trajectory coordinate group, for example, are corrected. For example, the difference between the first coordinates and the second coordinates is assumed to be 180 degrees.

The estimation unit 123 performs correction in such a way as to correct the average coordinates of the fourth trajectory coordinate group by rotating only these average coordinates of the fourth trajectory coordinate group by 180 degrees corresponding to the difference between the first coordinates and the second coordinates, 180 degrees, and to calculate the average of the average coordinates of the corrected fourth trajectory coordinate group and the average coordinates of the third trajectory coordinate group. Note that correction based on a difference between the first coordinates and the second coordinates is not limited to that applied to the fourth trajectory coordinate group. Only the third trajectory coordinate group may be corrected or both the third trajectory coordinate group and the fourth trajectory coordinate group may be corrected. Thus, the distortion of trajectory coordinates may be removed.

The estimation unit 123 estimates the phase of a signal received from the transmitting device 110 based on a value representing a difference between the average coordinates of the third trajectory coordinate group and the fourth trajectory coordinate group at least either of which has been corrected. That is, the estimation unit 123 estimates the phase of a signal based on a value representing a difference between the average coordinates of the third trajectory coordinate group and the fourth trajectory coordinate group from which distortion has been removed. Thus, the phase may be estimated in a situation where the distortion of trajectory coordinates is removed.

Here, a phase slip in QPSK is described. FIG. 1B is an explanatory representation illustrating an example of s phase slip in QPSK. In FIG. 1B, the horizontal axis represents the I-component and the vertical axis represents the Q-component. As illustrated in FIG. 1B, each symbol is arranged at any of positions of 45 degrees (=00), 135 degrees (=01), 225 degrees (=11), 315 degrees (=10), and each symbol is represented by two bits (quaternary).

In the transmitting device 110, a symbol 151 is arranged at a position of 45 degrees, a symbol 152 at a position of 135 degrees, a symbol 153 at a position of 225 degrees, and a symbol 154 at a position of 315 degrees, and signals are transmitted along a transmission channel. Each of the symbols 151 to 154 rotates along the transmission channel.

When the receiving device 120 receives a signal, the positions of the symbols 151 to 154 shift. For example, as illustrated in FIG. 1B, in the receiving device 120, phase slip occurs in which the symbols 151 to 154 each shift by 180 degrees as compared with the arrangement at the time of transmission of the transmitting device 110. Note that an angle at which each symbol shifts in the phase slip of QPSK is any of 90, 180, and 270 degrees. If each symbol shifts by 360 degrees, the phase of each symbol coincides with that in the case of a shift of 0 degrees. As a result, there is no shift in phase.

To suppress such a phase slip, in this embodiment, the average of trajectory coordinates among symbols is made different from the origin on the transmitting side, and the average of trajectory coordinates is estimated on the receiving side. Therefore, without including a pilot signal (refer to (A) and (B) in FIG. 19), which is a known signal for compensating for phase slip on the receiving side, in transmission signals, it is possible to determine phase slip on the receiving side. This makes it possible to accurately estimate the phase while suppressing a decrease in the transmission capacity of data.

(Example of Transmitting Device)

Figure 2:
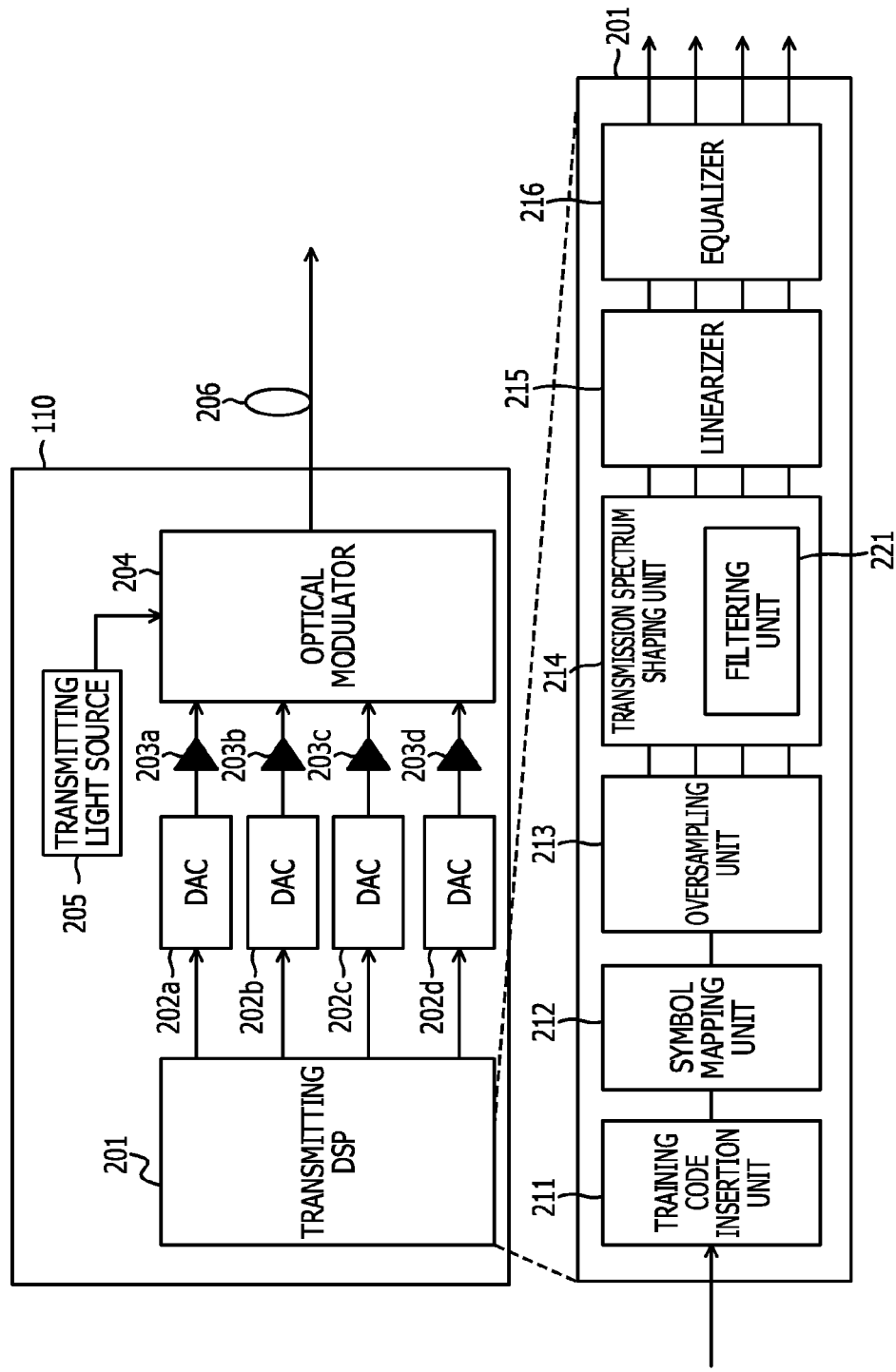
FIG. 2 is a diagram illustrating an example of a transmitting device.

FIG. 2 is a diagram illustrating an example of a transmitting device. As illustrated in FIG. 2, a transmitting device 110 includes a transmitting digital signal processor (DSP) 201, a digital-to-analog converter (DAC) 202, a driver amplifier 203, an optical modulator 204, and a transmitting light source 205.

The transmitting DSP 201 is a digital signal processing circuit, and produces digital electrical signals for transmission and outputs the signals to a plurality of (for example, four) DAC 202 (202a, 202b, 202c, and 202d). The transmitting DSP 201 includes a training code insertion unit 211, a symbol mapping unit 212, an oversampling unit 213, a transmission spectrum shaping unit 214, a linearizer 215, and an equalizer 216.

The training code insertion unit 211 performs processing for extracting information for synchronous processing and dispersion compensation of frames, and outputs signals subjected to such processing to the symbol mapping unit 212. The symbol mapping unit 212 generates positions of symbols (symbol coordinates) for symbol mapping on a constellation. The symbol mapping unit 212 generates, for example, symbol coordinates at coordinate positions where a constellation is formed as a square.

The symbol mapping unit 212 outputs signals based on the generated symbol coordinates to the oversampling unit 213. The oversampling unit 213 converts the signals input from the symbol mapping unit 212 into signals having a period double that of the input signals in order to perform spectral control of transmission. The oversampling unit 213 outputs the signals having the double period, which are the converted signal, to the transmission spectrum shaping unit 214.

The transmission spectrum shaping unit 214 filters the signals output from the oversampling unit 213 to shape the transmission spectra thereof, and outputs the signals to the linearizer 215. The transmission spectrum shaping unit 214 includes a filtering unit 221. For the signals converted by the oversampling unit 213 to have a double period, the filtering unit 221 causes the average coordinates of trajectory coordinates (oversampling points) between symbols to be coordinates different from the reference coordinates, thus providing asymmetric trajectory between symbols. The reference coordinates are coordinates of the point (origin) of orthogonal intersection of the I-axis and the Q-axis, or the average coordinates of symbol coordinates.

In the transmission spectrum shaping unit 214, two finite impulse response (FIR) filters having different characteristics, which operate at a double rate of oversampling, are arranged in parallel. Signals in accordance with coordinates of symbols of the main signal are input to the FIR filters. Each FIR filter is a filter capable of shaping the waveforms of baseband signals and applying different bandwidth control, and the FIR filters differ in terms of the number of taps (the number of filter stages).

The transmission spectrum shaping unit 214 passes a plus component and a minus component of each signal through filers with different numbers of filter stages, respectively, and adds them together to arrange the average coordinates of trajectory coordinates in the reference phase direction. Thus, in accordance with rotation of each pair of symbol coordinates in a transmission channel 206, the average coordinates of trajectory coordinates rotate likewise, that is, the reference phase direction rotates likewise. Note that, in the receiving device 120, the estimated phase direction is detected and is compared with the reference phase direction, so that compensation of the phase of symbol coordinates may be performed. A Nyquist filter, a Gaussian filter, or the like may be used in the transmission spectrum shaping unit 214.

The linearizer 215 corrects distortion in terms of the levels of signals output from the transmission spectrum shaping unit 214 to achieve the linearity, for example, and outputs the signals to the equalizer 216. The equalizer 216 corrects rounding of high speed signals due to distortion of hardware, and outputs the corrected signals to the DAC 202.

A plurality of (for example, four) DACs 202 are provided, and they each convert digital signals output from the transmitting DSP 201 to analog electrical signals. The DACs 202 (202a, 202b, 202c, and 202d) output the converted electrical signals to the respective corresponding driver amplifiers 203 (203a, 203b, 203c, and 203d).

A plurality of driver amplifiers 203 are provided to correspond to the DACs 202, and amplify signals output from the DACs 202, respectively, and output the signals to the optical modulator 204. The optical modulator 204 modulates signals output from the driver amplifiers 203 using light from the transmitting light source 205 to produce optical signals. The optical modulator 204 outputs the produced optical signals to the transmission channel 206.

(Example of Receiving Device)

Figure 3:
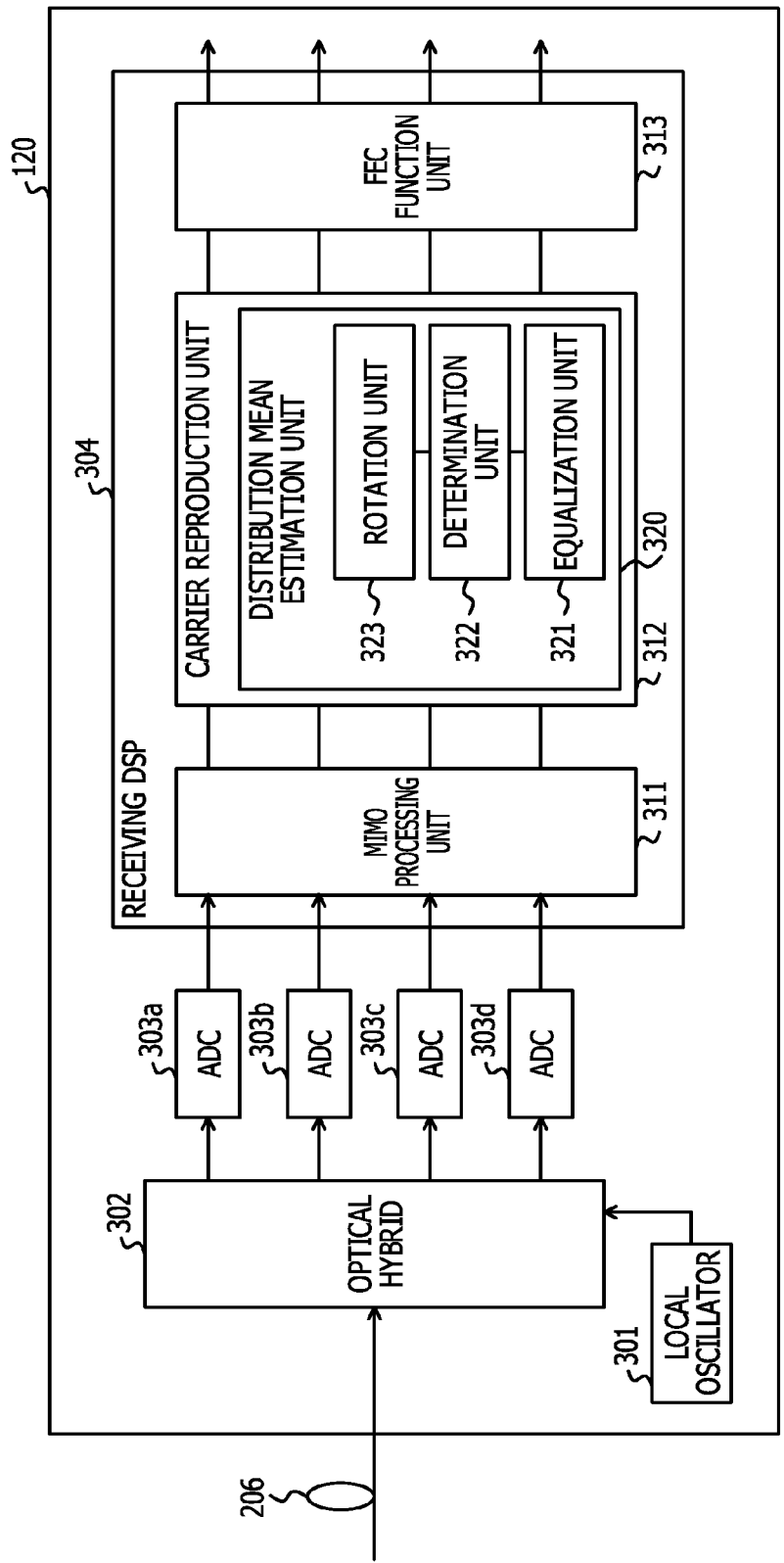
FIG. 3 is a diagram illustrating an example of a receiving device.

FIG. 3 is a diagram illustrating an example of a receiving device. As illustrated in FIG. 3, the receiving device 120 includes a local oscillator 301, an optical hybrid 302, analog-to-digital converters (ADCs) 303 (303a, 303b, 303c, and 303d), and a receiving DSP 304.

The receiving device 120 is an optical receiving device of a coherent method using the optical hybrid 302. The local oscillator 301 generates local oscillator light, and outputs the generated local oscillator light to the optical hybrid 302. A reception optical signal from the transmission channel 206 (the transmitting device 110) and local oscillator light from the local oscillator 301 are input to the optical hybrid 302. The optical hybrid 302 extracts two orthogonally polarized signals, a real part signal and an imaginary part signal, of the input reception optical signal, using the input local oscillator light.

Specifically, the optical hybrid 302 includes two polarizing beam splitters and two 90-degree hybrids, which are not illustrated. The optical hybrid 302 splits the reception optical signal and the local oscillator light into optical signals of two polarization directions (an H axis and a V axis) with the polarizing beam splitters, and extracts real part signals (I-components) and imaginary part signals (Q-components) from the optical signals using local oscillator light of the respective polarization directions with the 90-degree hybrids.

The optical hybrid 302 includes a plurality of (for example, four) photo diodes (PDs), and performs photoelectric conversion of an optical signal corresponding to the amplitude and phase of the I-component of signal light of the H axis (horizontal polarization) and an optical signal corresponding to the amplitude and phase of the Q-component of signal light of the H axis. The optical hybrid 302 also performs photoelectric conversion of an optical signal corresponding to the amplitude and phase of the I-component of signal light of the V axis (vertical polarization) and an optical signal corresponding to the amplitude and phase of the Q-component of signal light of the V axis. Then, the optical hybrid 302 outputs electrical signals in accordance with the intensities of received light to the corresponding ADCs 303.

Each ADC 303 performs digital conversion by performing digital sampling on a signal output from the optical hybrid 302 and quantizing the sampled signal. Each ADC 303 outputs the signal subjected to digital conversion to the receiving DSP 304.

The receiving DSP 304 includes a multi input multi output (MIMO) processing unit 311, a carrier reproduction unit 312, and a forward error correction (FEC) function unit 313. The MIMO processing unit 311 performs predetermined processing, such as, optical polarization splitting of a polarization-multiplexed signal, for example. The MIMO processing unit 311 outputs the signal subjected to the predetermined processing to the carrier reproduction unit 312.

The carrier reproduction unit 312 compensates for chromatic dispersion of a signal output from the MIMO processing unit 311, for example. The carrier reproduction unit 312 outputs the signal with the chromatic dispersion compensated for to the FEC function unit 313. The FEC function unit 313 performs error correction of the signal output from the carrier reproduction unit 312. The FEC function unit 313 outputs the signal subjected to the error correction to a later stage.

The carrier reproduction unit 312 includes a distribution mean estimation unit 320. The distribution mean estimation unit 320 detects phase slip of symbol coordinates on a constellation, and performs phase compensation. Here, in digital coherent reception, in order to correctly receive transmitted data, it is desirable to compensate for phase slip caused by rotation of symbol coordinates. Phase slip arises from phase noise of the transmission channel 206, frequency fluctuations in transmitting light and receiving local oscillation light, and the like. The phase slip occurs when processing is performed by a phase estimation circuit (carrier phase recovery (CPR)) included in the distribution mean estimation unit 320.

Occurrence of phase slip causes symbol coordinates on the constellations on the transmitting side and the receiving side to enter a situation where symbol coordinates on one of the transmitting side and the receiving side are rotated from those on the other by 90, 180, or 270 degrees. In this situation, the symbol coordinates on the receiving side appear in a quadrant on the constellation, the quadrant being different from that intended by the transmitting side. Correct communication is thus not achieved. To address this, the distribution mean estimation unit 320 compensates for the phase slip, for example, at the same time it performs CPR processing. Note that the distribution mean estimation unit 320 may compensate for phase slip for signals after CPR processing.

Specifically, the distribution mean estimation unit 320 includes an equalization unit 321, a determination unit 322, and a rotation unit 323. The equalization unit 321 calculates the average coordinates of trajectory coordinates between symbol coordinates and the average coordinates of symbol coordinates for a received signal. The determination unit 322 calculates the estimated phase direction (vector) based on a difference of the average coordinates of symbol coordinates and the average coordinates of trajectory coordinates calculated by the equalization unit 321, and determines the orientation of the constellation. The timing of determination is a timing at which a fixed period has passed or a timing at which the amount of signal accumulation reaches a fixed level.

The rotation unit 323 rotates the I axis and the Q axis, and symbol coordinates, based on a result of determination made by the determination unit 322. For example, in a case where the average coordinates (reference phase direction) of the trajectory coordinates in the transmitting device 110 are in a first quadrant direction, the receiving device 120 rotates symbol coordinates so that the trajectory coordinates (estimated phase direction) are in the first quadrant.

Thus, the phase slip may be compensated for. In the above description, phase slip is determined concurrently with processing of CPR. The phase may therefore be accurately estimated with a small circuit. In addition, compensation for phase slip may be performed after processing of CPR. The phase may therefore be accurately estimated through simple processing.

Note that the receiving unit 121 illustrated in FIG. 1A may be, for example, implemented by the local oscillator 301, the optical hybrid 302, and the ADCs 303. Note also that the semiconductor 130 illustrated in FIG. 1A may be implemented, for example, by the receiving DSP 304. In particular, the accumulation unit 122 and the estimation unit 123, which are illustrated in FIG. 1A, may be implemented, for example, by the distribution mean estimation unit 320.

(Example of Sampling of Signals)

Figure 4:
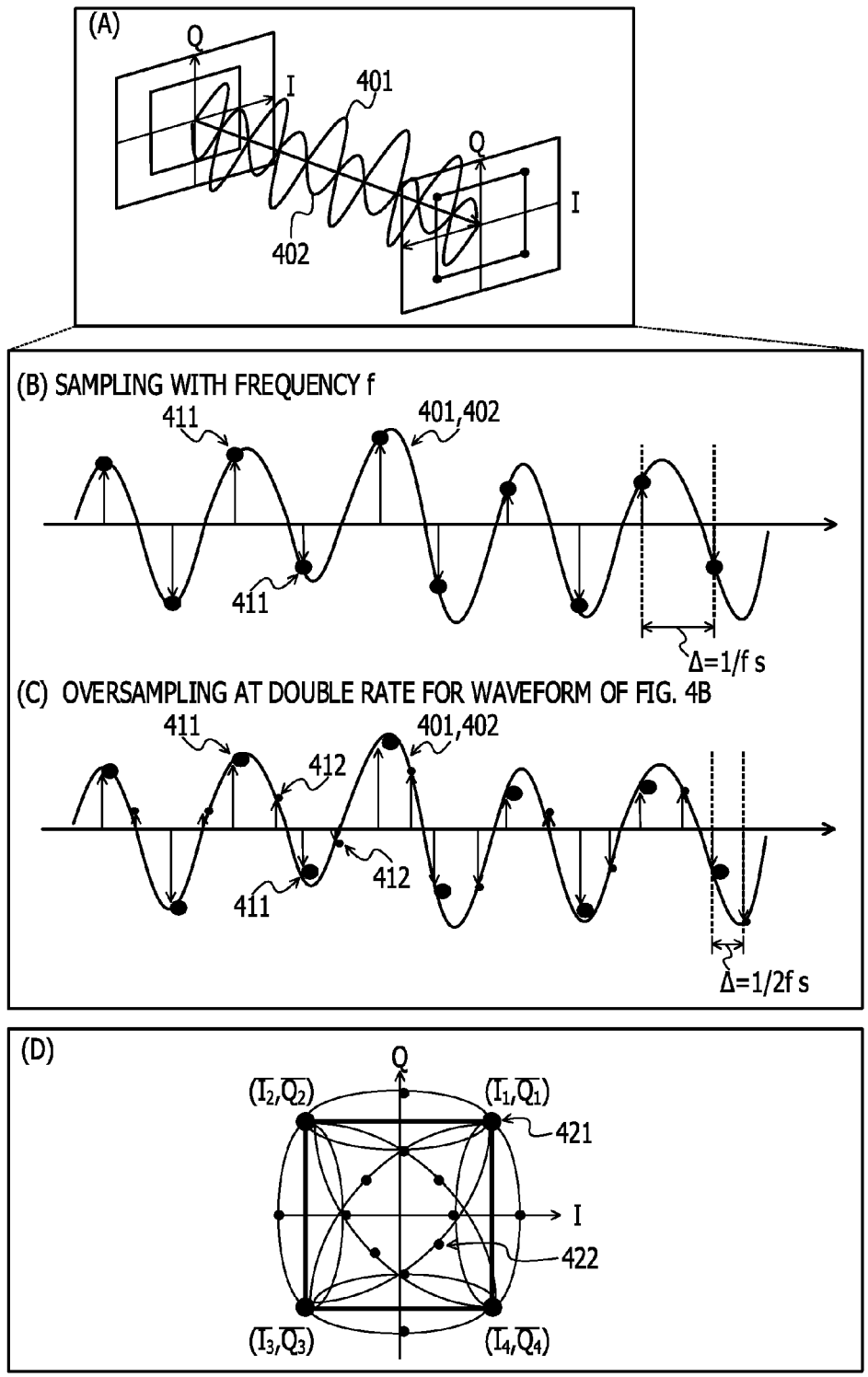
FIG. 4 is a diagram illustrating an example of sampling of signals.

FIG. 4 is a diagram illustrating an example of sampling of signals. Two orthogonally polarized signals 401 and 402 are illustrated in (A). FIG. 4 illustrates the case where the signals 401 and 402 are sampled with a frequency f in (B). In (B), symbols 411 are collected as samples with the frequency f.

FIG. 4 illustrates the case where oversampling at a double rate is performed for the waveform of (B) in (C). As illustrated in (C), oversampling points 412 are collected as samples at positions corresponding to midpoints of the symbols 411 collected as samples.

FIG. 4 illustrates a constellation of symbol coordinates 421 in (D), which correspond to the symbols 411 collected as samples, and trajectory coordinates 422, which correspond to the oversampling points 412. As illustrated in (D), the symbol coordinates 421 are arranged at positions of 45 degrees (=00), 135 degrees (=01), 225 degrees (=11), and 315 degrees (=10). Pluralities of trajectory coordinates 422 are arranged at positions that are almost symmetrical with respect to the point of orthogonal intersection (origin) of the I-axis and the Q-axis. For this reason, the average coordinates of the pluralities of trajectory coordinates 422 are in the vicinity of the origin.

(Example of Average Coordinates of Trajectory Coordinates)

FIG. 5 is a diagram illustrating an example of the average coordinates of trajectory coordinates. In (A), the horizontal axis represents time and the vertical axis represents the phase. Each pair of symbol coordinates 421 is arranged at any position of 45, 135, 225, and 315 degrees, and each pair of symbol coordinates is represented by two bits (quaternary). FIG. 5 illustrates that signals of 01, signals of 00, signals of 11, and signals of 10 are sequentially transmitted as time passes in (A).

The transmitting device 110 obtains the trajectory coordinates 422 corresponding to the oversampling points 412 collected as samples between respective one of the symbol coordinates 421. The transmitting device 110 transmits pluralities of symbol coordinates 422 as well as the symbol coordinates 421 to the receiving device 120.

As illustrated in the constellation of (B), average coordinates 501 of the pluralities of trajectory coordinates 422 are positioned, for example, at the origin. In contrast, in the transmitting device, a plurality of Nyquist filters are provided with different numbers of taps (numbers of filter stages) or different roll-off factors, and thus, as illustrated in (C), the trajectory coordinates 422 may be shifted from the positions of (A).

The average coordinates 510 of the pluralities of trajectory coordinates 422 are, as illustrated in (D), coordinates of the first quadrant that are shifted from the origin in a reference phase direction 520. Note that the average coordinates 510 of the trajectory coordinates 422 are not limited to being in the first quadrant, but may be in any of the second quadrant, the third quadrant, and the fourth quadrant. In this embodiment, it is assumed that the direction in which the average coordinates 510 of the trajectory coordinates 422 are positioned in the first quadrant is a reference direction.

(Example of Compensation Operations of Phase Slip)

Figure 6:
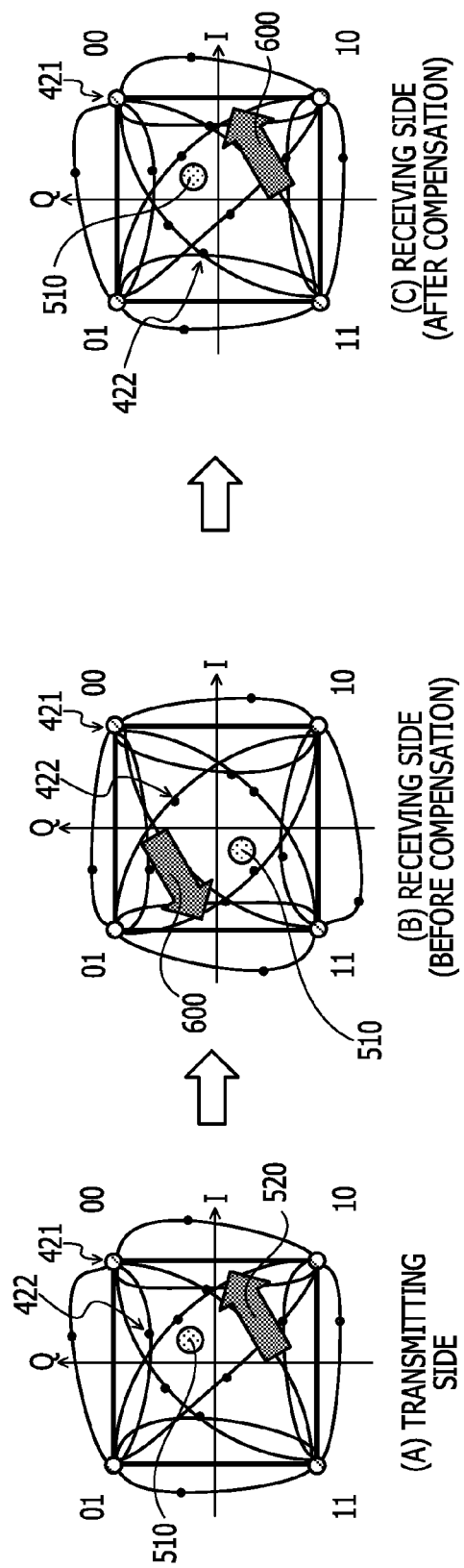
FIG. 6 is a diagram illustrating an example of operations of compensating for phase slip.

FIG. 6 is a diagram illustrating an example of operations of compensating for phase slip. As illustrated in (A), the transmitting device 110 arranges the average coordinates 510 of the pluralities of trajectory coordinates 422 at a position different from that of the origin. The transmitting device 110 transmits signals based on the pluralities of trajectory coordinates 422 with the average coordinates in the first quadrant and the symbol coordinates 421 through the transmission channel 206 to the receiving device 120.

In the transmission channel 206, each pair of symbol coordinates 421 rotates. The receiving device 120 calculates an estimated phase direction 600 based on a difference between the average coordinates 510 of the trajectory coordinates 422, and the average coordinates of the symbol coordinates 421. For example, as illustrated in (B), it is assumed that the receiving device 120 calculates that the estimated phase direction 600 is a direction of the third quadrant. FIG. 6 illustrates that the average coordinates 510 differs from the estimated phase direction 600 in terms of direction, and phase slip has occurred. That is, as the symbol coordinates 421 rotate in (B), the trajectory coordinates 422 and the average coordinates 510 of the trajectory coordinates 422 also rotate.

To address this, the receiving device 120 compares the average coordinates 510 with the estimated phase direction 600, and, in accordance with a comparison result, rotates the I-axis and the Q-axis (or the symbol coordinates 421) as illustrated in (C). For example, as illustrated in (C), the receiving device 120 rotates the I-axis and the Q-axis so that the estimated phase direction 600 calculated coincides with the reference phase direction 520 in the transmitting device 110 determined in advance. Specifically, since the reference phase direction 520 of the transmitting device 110 is a direction of the first quadrant, the receiving device 120 rotates the I-axis and the Q-axis by 180 degrees. The receiving device 120 may thus cause the estimated phase direction 600 to coincide with the reference phase direction in the transmitting device 110.

(Example of Eye Pattern and Constellation in Case where Average Coordinates of Trajectory Coordinates are Coordinates Different from Those of Origin)

Figure 7:
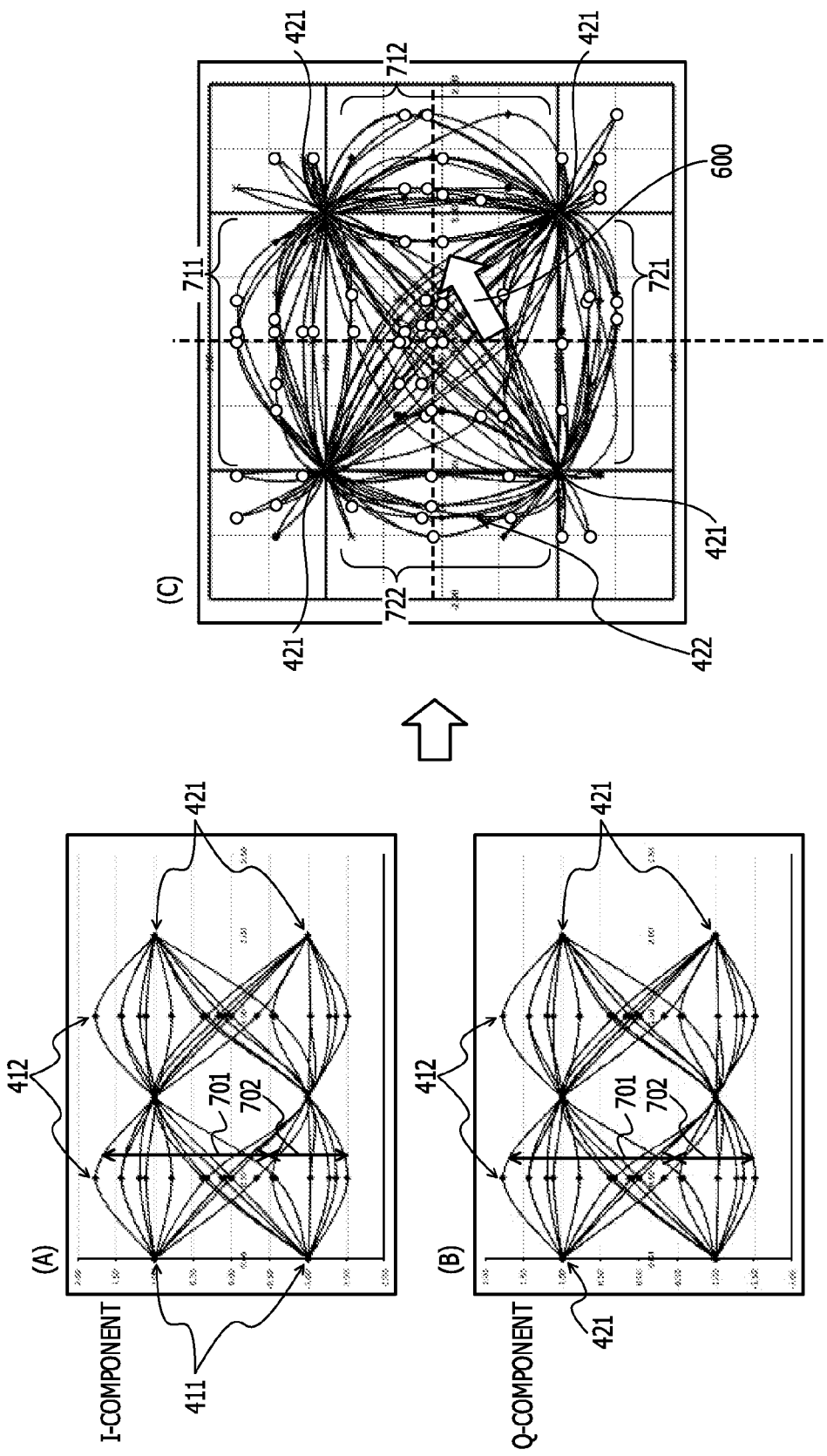
FIG. 7 is a diagram illustrating an example of eye patterns and constellations in the case where the average coordinates are coordinates different from those of the origin.

FIG. 7 is a diagram illustrating an example of eye patterns and constellations in the case where the average coordinates are coordinates different from those of the origin. FIG. 7 illustrates an eye pattern of I-components in (A). FIG. 7 illustrates an eye pattern of Q-components in (B). In (A) and (B), the horizontal axis represents time and the vertical axis represents the power. The eye patterns illustrated in (A) and (B) have almost the same shape.

FIG. 7 illustrates a constellation of QPSK in (C). As illustrated in (A) to (C), the positions of the symbol coordinates 421 have hardly changed. In contrast, the trajectory coordinates 422 between the symbol coordinates 421 change. For example, in (A) and (B), the distribution of the trajectory coordinates 422 is wider in a range 701 than in a range 702.

In addition, as illustrated in (C) the average coordinates of the trajectory coordinates 422 are, as indicated by the estimated phase direction 600, not provided at the origin but is shifted to the first quadrant. In more detail, as illustrated in (C), the pluralities of trajectory coordinates 422 are distributed in such a manner as to widen (expand) upward as indicated by the range 711 rather than to widen downward as indicated by the range 721. Similarly, the pluralities of trajectory coordinates 422 are distributed in such a manner as to widen (expand) rightward as indicated by a range 712 rather than to widen leftward indicated by a range 722. In such a manner, the average coordinates of the pluralities of trajectory coordinates 422 are arranged to be shifted in the estimated phase direction 600 from the origin.

(Detailed Configuration of Filtering Unit)

Figure 8:
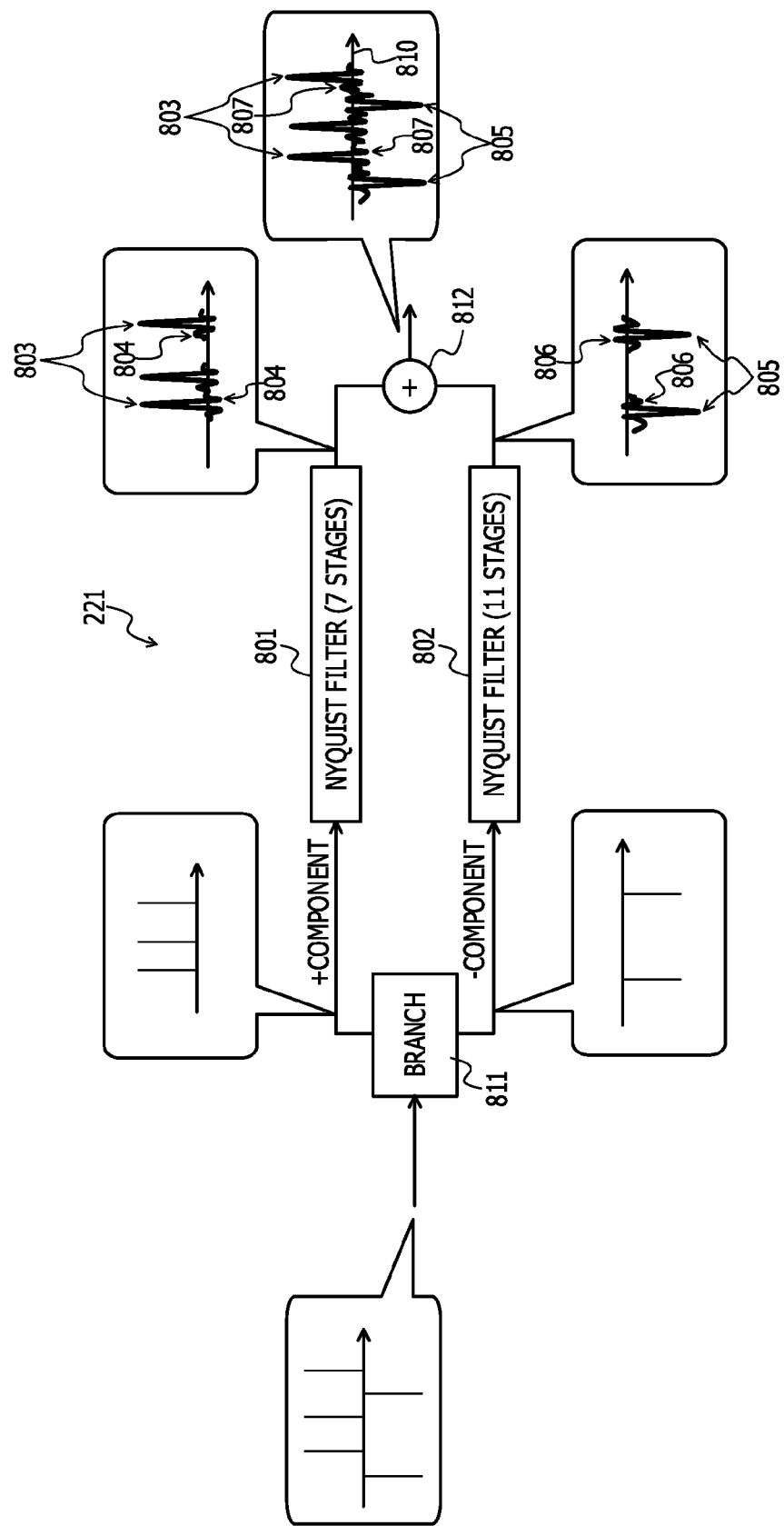
FIG. 8 is a diagram illustrating a detailed configuration of a filtering unit.

FIG. 8 is a diagram illustrating a detailed configuration of a filtering unit. As illustrated in FIG. 8, the filtering unit 221 includes a plurality of Nyquist filters 801 and 802, a branching unit 811, and an adding unit 812. Note that each constitution unit illustrated in FIG. 8 is provided to correspond to each of the I-component and the Q-component.

The branching unit 811 branches an input signal to a plus component and a minus component, and outputs the plus component to the Nyquist filter 801 and outputs the minus component to the Nyquist filter 802. The Nyquist filter 801 has, for example, seven filter stages. The Nyquist filter 802 has, for example, eleven filter stages. The Nyquist filters 801 and 802 perform filtering of respective signals input thereto, and output the signals to the adding unit 812. Specifically, the Nyquist filters 801 and 802 shape the waveforms of baseband signals and apply different bandwidth control to the signals, and output the signals to the adding unit 812.

The Nyquist filters 801 and 802 shape waveforms. In diagrams of waveforms in FIG. 8, the horizontal axis represents time, and the vertical axis represents coordinates. The Nyquist filter 801 shapes a peak waveform 803 protruding upward and shapes an inter-peak waveform 804 slightly fluctuating in the periphery of the peak waveform 803. Note that the details of waveforms shaped by the Nyquist filters 801 and 802 will be described below in conjunction with FIG. 10A to FIG. 11C.

The Nyquist filter 802 shapes a peak waveform 805 protruding downward and shapes an inter-peak waveform 806 slightly fluctuating on the periphery of the peak waveform 805. Signals output from the Nyquist filters 801 and 802 are added by the adding unit 812. Once signals are added by the adding unit 812, a composite waveform 807 of the inter-peak waveforms 804 and 806 is deflected either upward or downward with respect to the horizontal axis 810 in accordance with the numbers of stages of the Nyquist filters 801 and 802.

In FIG. 8, the composite waveform 807 of the inter-peak waveforms 804 and 806 is deflected, for example, downward relative to the horizontal axis. In such a manner, the composite waveform 807 may be deflected by taking a difference between the number of stages of the Nyquist filter 801 and the number of stages of the Nyquist filter 802. Thus, based on signals output from the adding unit 812, the constellation illustrated in (C) in FIG. 7 may be obtained. That is, the average coordinates of the trajectory coordinates 422 between the symbol coordinates 421 may be provided as coordinates shifted from the origin in the reference phase direction 520.

(Example of Configuration of Nyquist Filter)

Figure 9:
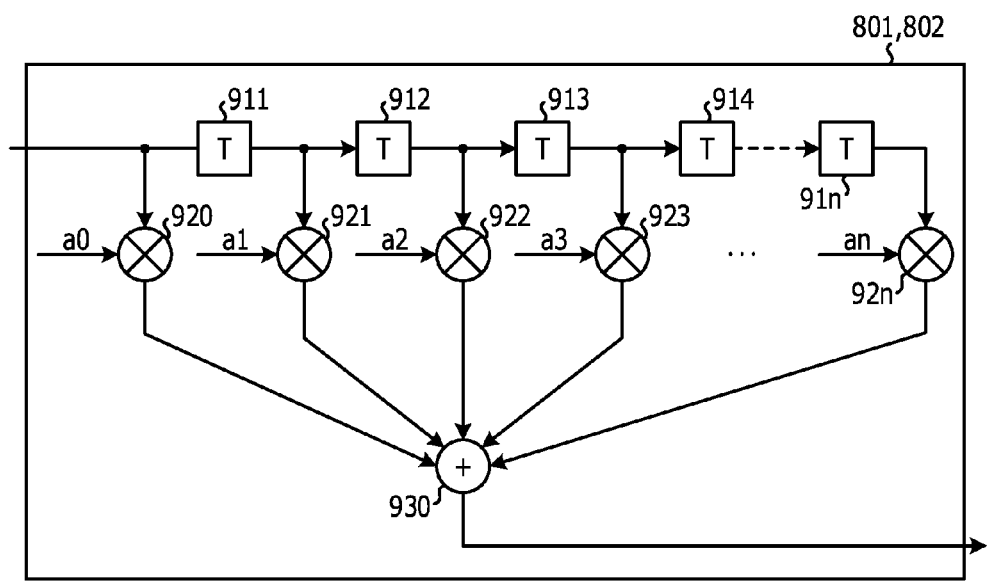
FIG. 9 is a block diagram illustrating an example of a configuration of a Nyquist filter.

FIG. 9 is a block diagram illustrating an example of a configuration of a Nyquist filter. As illustrated in FIG. 9, the Nyquist filter 801 or 802 includes delay circuits 911 to 91n, multiplication circuits 920 to 92n, addition circuit 930, and a tap coefficient control circuit not illustrated (corresponding to a filter controller 1400 of FIG. 14) (n=5, 6, 7, . . . ).

The tap coefficient control circuit of the Nyquist filter 801 or 802 inputs tap coefficients a0 to an to the multiplication circuits 920 to 92n, respectively. A baseband signal input to the Nyquist filter 801 or 802 is input to each of the multiplication circuit 920 and the delay circuit 911. The multiplication circuit 920 multiplies the input baseband signal by the tap coefficient a0, and outputs the multiplied baseband signal to the addition circuit 930.

The delay circuit 911 delays the input baseband signal, and outputs the delayed baseband signal to each of the multiplication circuit 921 and the delay circuit 912. The multiplication circuit 921 multiplies the baseband signal output from the delay circuit 911 by the tap coefficient a1, and outputs the multiplied baseband signal to the addition circuit 930.

The delay circuit 912 delays the baseband signal output from the delay circuit 911, and outputs the delayed baseband signal to each of the multiplication circuit 922 and the delay circuit 913. The multiplication circuit 922 multiplies the baseband signal output from the delay circuit 912 by the tap coefficient a2, and outputs the multiplied baseband signal to the addition circuit 930.

The delay circuit 913 delays the baseband signal output from the delay circuit 912, and outputs the delayed baseband signal to each of the multiplication circuit 923 and the delay circuit 914. The multiplication circuit 923 multiplies the baseband signal output from the delay circuit 913 by the tap coefficient a3, and outputs the multiplied baseband signal to the addition circuit 930.

The delay circuit 91n delays a baseband signal output from the delay circuit 91(n−1), and outputs the delayed baseband signal to the multiplication circuit 92n. The multiplication circuit 92n multiplies the baseband signal output from the delay circuit 91n by the tap coefficient an, and outputs the multiplied baseband signal to the addition circuit 930.

The addition circuit 930 adds up baseband signals output from the multiplication circuits 920 to 92n, and outputs the added baseband signals to a complex multiplier (not illustrated) at a later stage. The tap coefficient control circuit of the Nyquist filter 801 or 802 adjusts the tap coefficients a0 to an to be input to the multiplication circuits 920 to 92n based on a delay variation amount a notification of which has been sent from a delay-variation-amount operation unit (not illustrated) that calculates a delay variation amount. Thus, the delay amount of a baseband signal may be varied.

(Changes in Waveform when Numbers of Filter Stages (Tap Coefficients) are Changed)

Figure 10A:
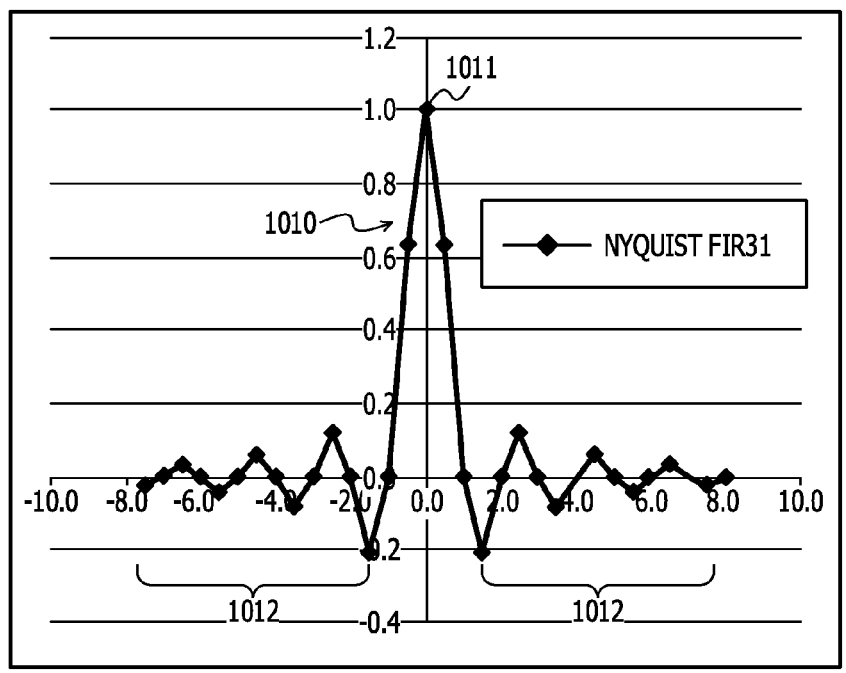
FIG. 10A is a diagram illustrating an example of a waveform in the case where the number of filter stages is 31.
Figure 10B:
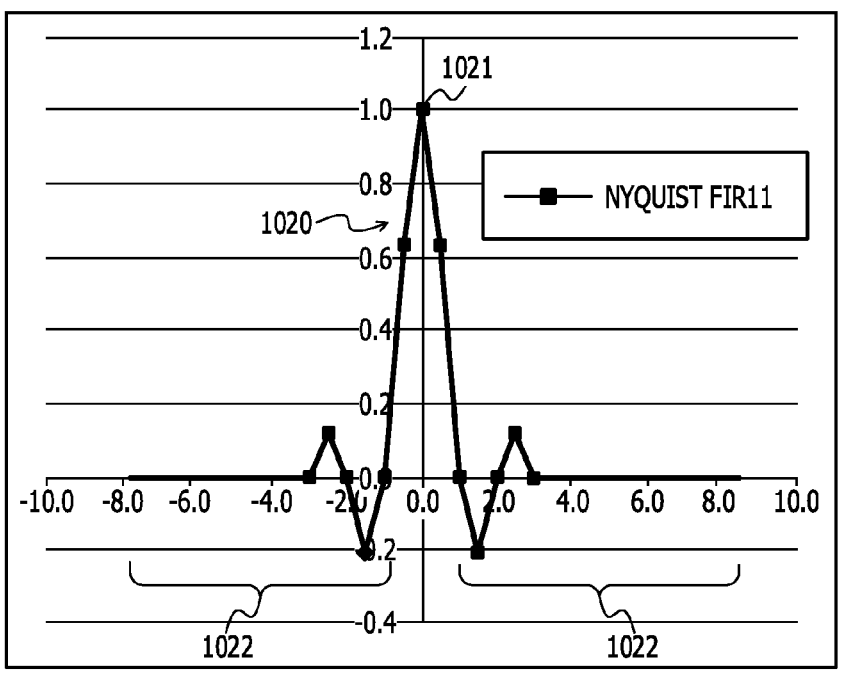
FIG. 10B is a diagram illustrating an example of a waveform in the case where the number of filter stages is 11.
Figure 10C:
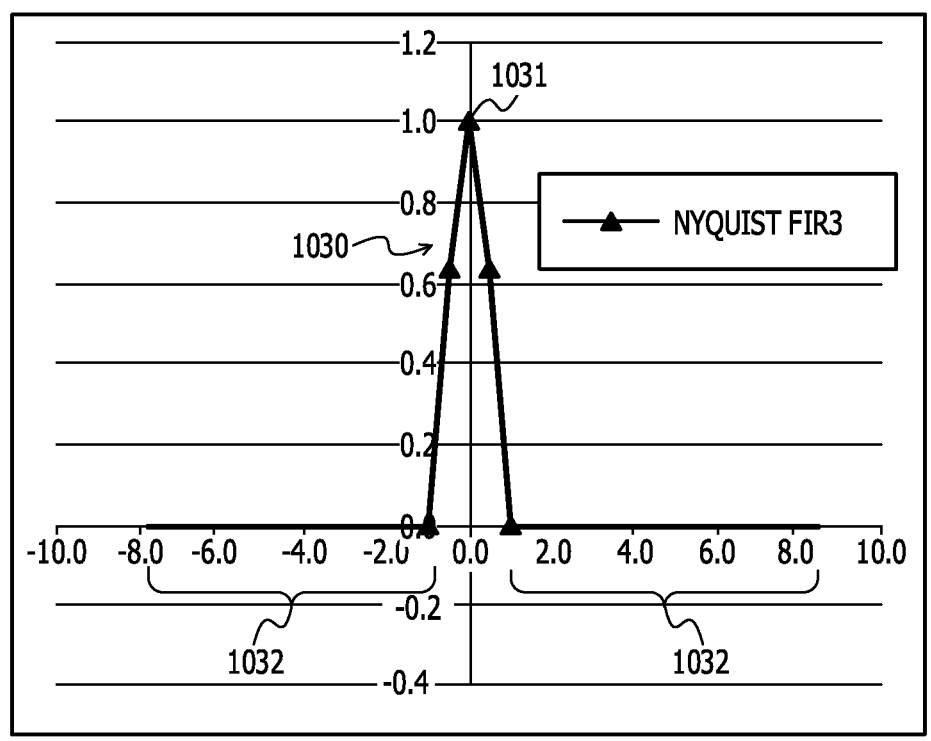
FIG. 10C is a diagram illustrating an example of a waveform in the case where the number of filter stages is three.

FIG. 10A is a diagram illustrating an example of a waveform in the case where the number of filter stages is 31. FIG. 10B is a diagram illustrating an example of a waveform in the case where the number of filter stages is 11. FIG. 10C is a diagram illustrating an example of a waveform in the case where the number of filter stages is three. In FIG. 10A, FIG. 10B, and FIG. 10C, the horizontal axis represents time and the vertical axis represents the coordinates (the I coordinate or the Q coordinate).

As illustrated in FIG. 10A, in a waveform 1010, a waveform 1012 of the peripheral region centered around a peak 1011, which corresponds to symbol coordinates, is shaped. As illustrated in FIG. 10B, in a waveform 1020, a waveform 1022 of the peripheral region centered around a peak 1021, which corresponds to symbol coordinates, is shaped. As illustrated in FIG. 10C, in a waveform 1030, a waveform 1032 of the peripheral region centered around a peak 1031, which corresponds to symbol coordinates, is shaped.

When FIG. 10A, FIG. 10B, and FIG. 10C are compared, the peaks 1011, 1021, and 1031 are the same, and the waveforms 1012, 1022, and 1032 of the peripheral regions are different. The waveform 1012 of the peripheral region of FIG. 10A has a shape in which the waveform spreads along the horizontal-axis direction while fluctuating in the vertical-axis direction. The waveform 1022 of the peripheral region of FIG. 10B has a shape in which a spread along the horizontal-axis direction with a fluctuation in the vertical-axis direction is smaller compared with the waveform 1012. The waveform 1032 of the peripheral region of FIG. 10C is shaped to be a waveform without a fluctuation in the vertical-axis direction.

In such a manner, in the waveforms 1012, 1022, and 1032 of the peripheral regions, the larger the number of filter stages is, the larger the spread along the horizontal-axis direction with a fluctuation in the vertical-axis direction is, and the smaller the number of filter stages is, the smaller the fluctuation in the vertical-axis direction is. Note that when each number of filter stages is an odd number, the peaks 1011, 1021, and 1031 centered around the origin illustrated in FIG. 10A, FIG. 10B, and FIG. 10C may be obtained.

In such a manner, varying in the number of filter stages may cause varying in the waveforms 1012, 1022, and 1032 of peripheral regions. Consequently, as illustrated in FIG. 8, an input signal is branched, the resulting components are subjected to filter processing by using the Nyquist filters 801 and 802 having different numbers of stages and are added, so that the composite waveform 807 of the inter-peak waveforms 804 and 806 may be deflected.

(Changes in Frequency Components when Numbers of Filter Stages are Changed)

Figure 11A:
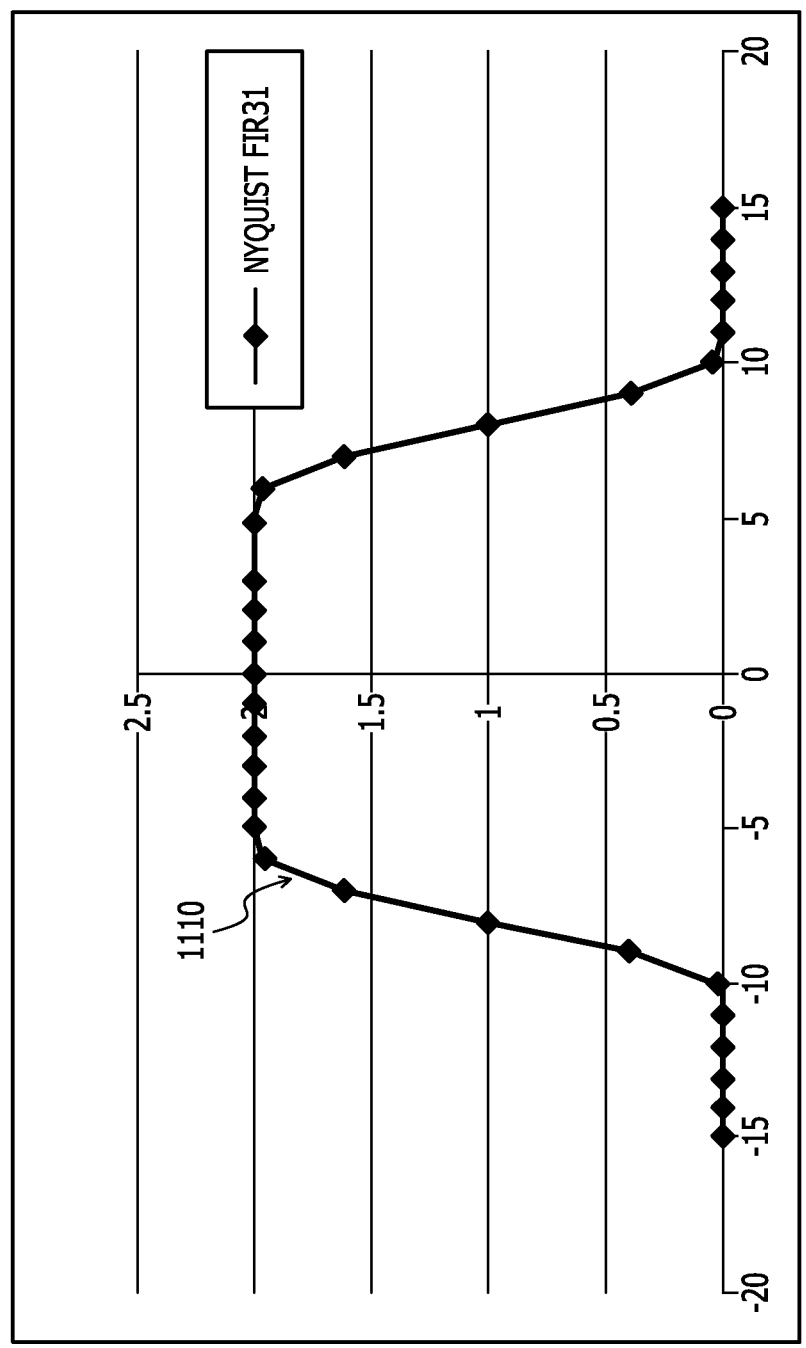
FIG. 11A is a diagram illustrating an example of frequency components of a waveform in the case where the number of filter stages is 31.
Figure 11B:
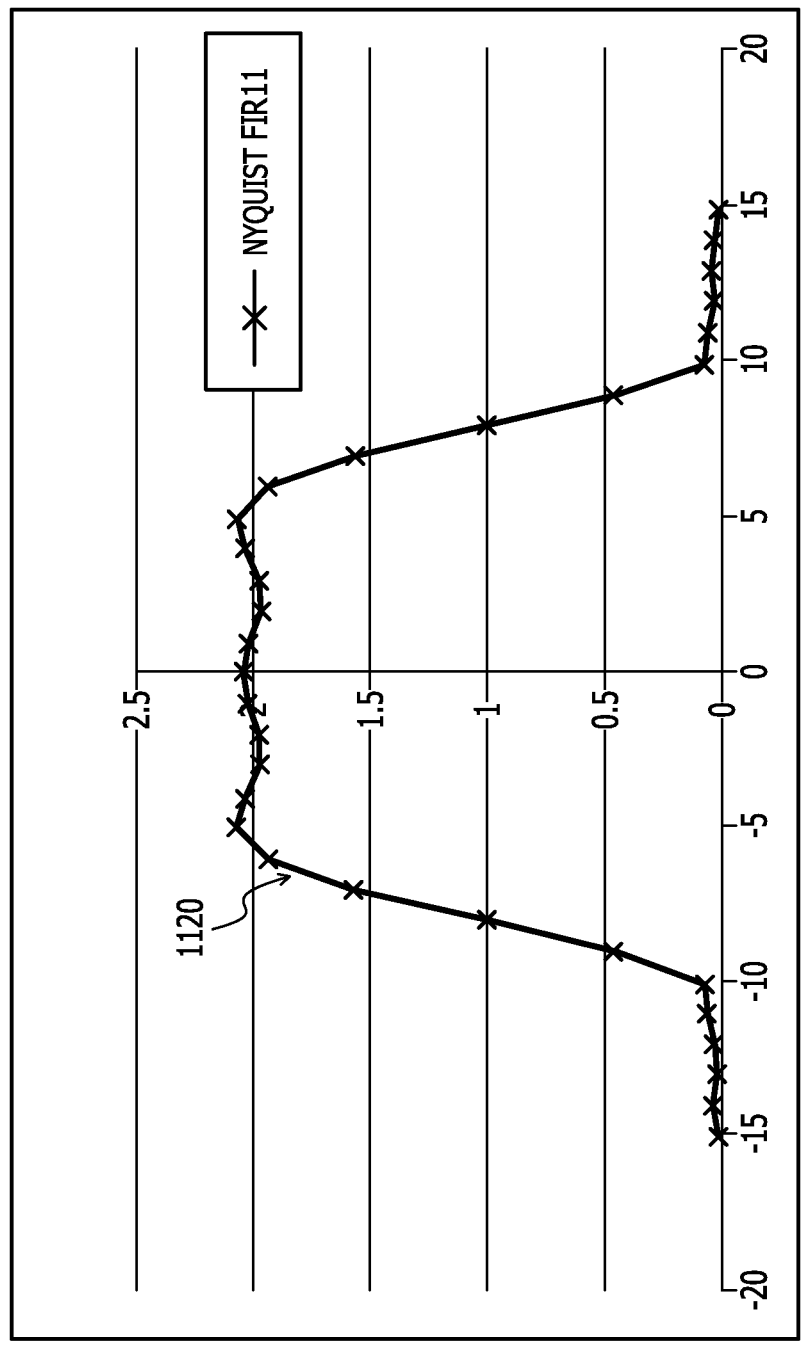
FIG. 11B is a diagram illustrating an example of frequency components of a waveform in the case where the number of filter stages is 11.

FIG. 11A is a diagram illustrating an example of frequency components of a waveform in the case where the number of filter stages is 31. FIG. 11B is a diagram illustrating an example of frequency components of a waveform in the case where the number of filter stages is 11. FIG. 11C is a diagram illustrating an example of frequency components of a waveform in the case where the number of filter stages is three.

In FIG. 11A, FIG. 11B, and FIG. 11C, the horizontal axis represents the wavelength of light and the vertical axis represents the power of light, and the roll-off factor is assumed to be, for example, 0.3. When FIG. 11A, FIG. 11B, and FIG. 11C are compared, the waveform 1110 (1120) where the number of filter stages is large has a shape like a rectangle as compared with the waveform 1130 of the peripheral region where the number of filter stages is small. That is, the Nyquist filters 801 and 802 prove that the larger the number of filter stages is, the more the transmission bandwidth may be decreased. As a result, the larger the number of filter stages, the more the spectral efficiency of signals may be improved.

(Transmitting Process Performed by Transmitting Device)

Figure 12:
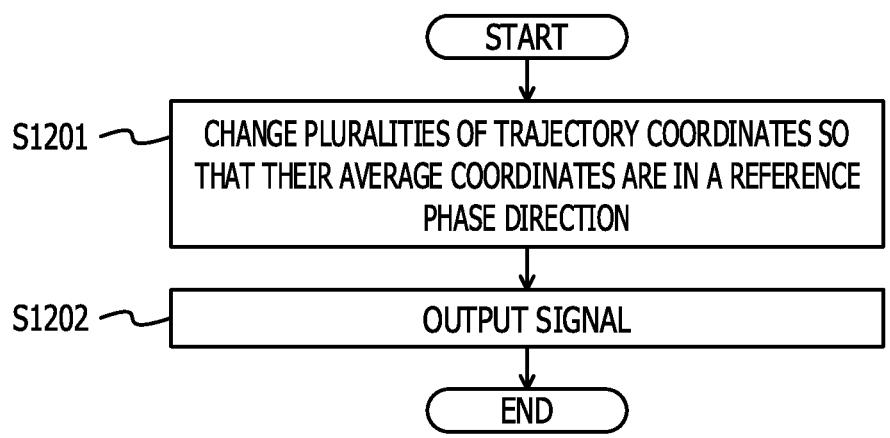
FIG. 12 is a flowchart illustrating an example of a transmitting process performed by a transmitting device.

FIG. 12 is a flowchart illustrating an example of a transmitting process performed by a transmitting device. As illustrated in FIG. 12, the transmitting device 110 changes pluralities of trajectory coordinates so that the average coordinates of the trajectory coordinates are in a reference phase direction (step (hereinafter abbreviated as "S") 1201). Then, the transmitting device 110 outputs a signal based on symbol coordinates and the trajectory coordinates whose average coordinates have been changed to the reference phase direction in order to transmit the signals to the receiving device 120 (S1202), and ends the transmitting process.

(Receiving Process Performed by Receiving Device)

Figure 13:
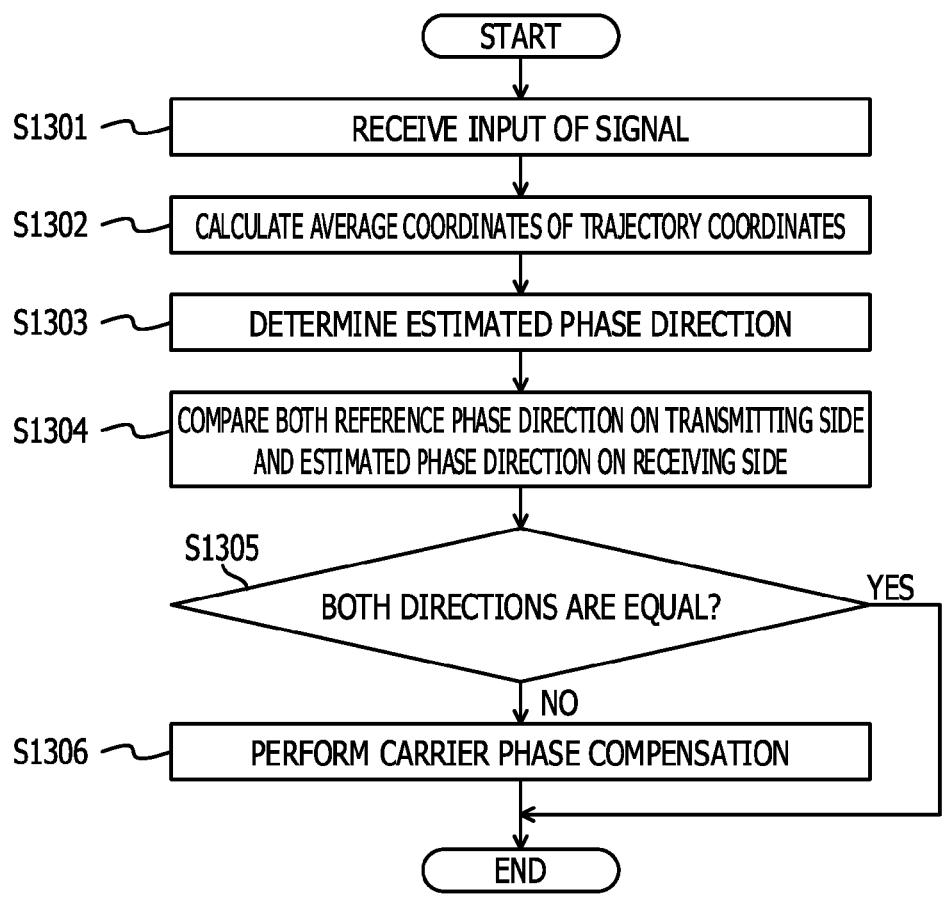
FIG. 13 is a flowchart illustrating an example of a receiving process performed by a receiving device.

FIG. 13 is a flowchart illustrating an example of a receiving process performed by a receiving device. As illustrated in FIG. 13, the receiving device 120 receives input of a signal from the transmitting device 110 (S1301). Next, the receiving device 120 calculates the average coordinates of trajectory coordinates between symbol coordinates obtained by oversampling (S1302). Then, the receiving device 120 determines the estimated phase direction based on a difference between the average coordinates of symbol coordinates and the average coordinates of trajectory coordinates (S1303). Note that when there is no signal distortion and the average coordinates of symbol coordinates are the origin, the estimated phase direction may be determined based on a difference between the origin and the average coordinates of trajectory coordinates in S1303.

Next, the receiving device 120 compares both the reference phase direction on the transmitting side and the estimated phase direction on the receiving side (S1304), and determines whether or not both the reference phase direction on the transmitting side and the estimated phase direction on the receiving side are equal (S1305). When both the reference phase direction on the transmitting side and the estimated phase direction on the receiving side are equal (S1305: Yes), the receiving device 120 ends the receiving process. When the reference phase direction on the transmitting side and the estimated phase direction on the receiving side are not equal (S1305: No), the receiving device 120 performs carrier phase compensation (S1306) and ends the receiving process. In the carrier phase compensation, symbol coordinates are corrected so that the estimated phase direction on the receiving side coincides with the reference phase direction on the transmitting side.

(Exclusion of Effect of Distortion of Dynamic Range and Like)

Next, exclusion of an effect of distortion of a dynamic range or the like will be described. In hardware of the transmitting device 110 and the receiving device 120, for example, distortion of a dynamic range occurs. Distortion of a dynamic range is, for example, that pluralities of symbol coordinates and trajectory coordinates become coordinates different from those determined in advance.

In order to remove this distortion, for example, the transmitting device 110 transmits signals obtained under a condition where the numbers of filter stages of the two Nyquist filters 801 and 802 are alternately selected. The receiving device 120 detects a difference between patterns between which the numbers of filter stages of the Nyquist filters 801 and 802 are replaced with each other, and thus may compensate for distortion. The case where the Nyquist filters 801 and 802 are alternately selected in order to exclude the effect of distortion of a dynamic range or the like will be described in detail below.

(Example of Procedure Performed by Transmitting Device for Alternately Selecting Nyquist Filters)

Figure 14:
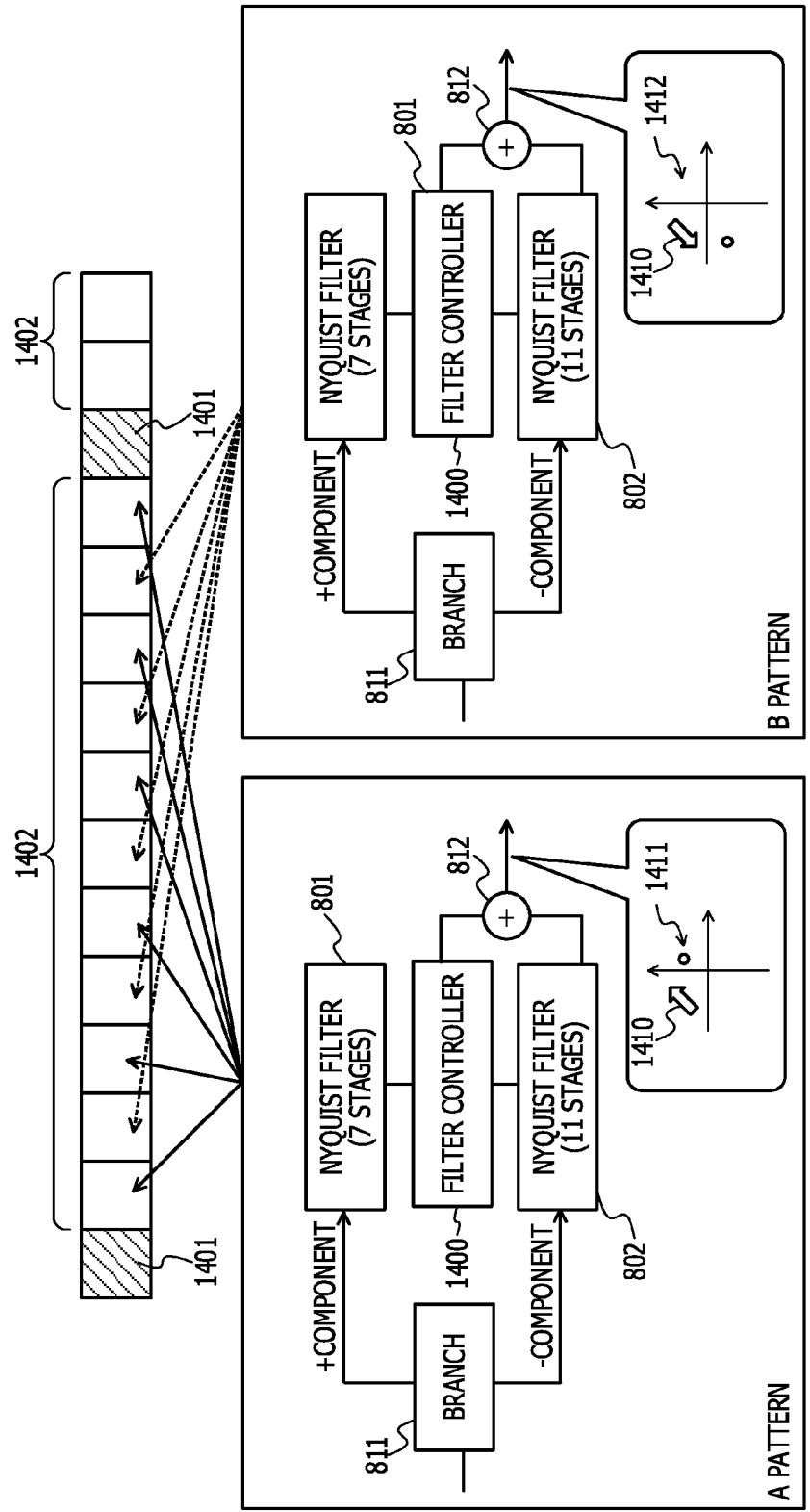
FIG. 14 is an explanatory representation illustrating an example of a procedure performed by the transmitting device for alternately selecting Nyquist filters.

FIG. 14 is an explanatory representation illustrating an example of a procedure performed by the transmitting device for alternately selecting Nyquist filters. As illustrated in FIG. 14, for example, it is assumed that a specific number of bits (signal) 1402 are present after a portion of frame detection 1401, for example. The frame detection 1401 is detection of a frame for identifying the head of data. Note that, detection for identifying the head of data is not limited to the frame detection 1401, and may be, for example, detection of a control signal indicating the number of bits arranged at the head of data.

For the bits of a specific number of bits after the portion of the frame detection 1401, the transmitting device 110 produces signals subjected to filter processing in which the numbers of stages of the Nyquist filters 801 and 802 are alternately different. Specifically, the transmitting device 110 includes a filter controller 1400 that sets the numbers of filter stages of the Nyquist filters 801 and 802 to values obtained by replacing these numbers with each other. In the case of generating a signal of an A pattern 1411 where the reference phase direction 1410 is a direction of the first quadrant, the filter controller 1400 sets, for example, the Nyquist filter 801 to which plus components are input to seven stages, and the Nyquist filter 802 to which minus components are input to eleven stages.

In the case of generating a signal of a B pattern 1412 where the reference phase direction 1410 is a direction of the third quadrant, the filter controller 1400 sets, for example, the Nyquist filter 801 for plus components to eleven stages, and the Nyquist filter 802 for minus components to seven stages. The B pattern 1412 is a pattern in which the A pattern 1411 is reversely rotated by 180 degrees.

In such a way, upon the frame detection 1401, the transmitting device 110 transmits signals while alternately selecting the patterns, the A pattern 1411→the B pattern 1412→the A pattern 1411→the B pattern 1412→ . . . . Upon the next frame detection 1401, the transmitting device 110 transmits signals for a specific number of bits while alternately selecting the patterns, the A pattern 1411→the B pattern 1412→the A pattern 1411→the B pattern 1412→ . . . . Note that the A pattern and the B pattern in FIG. 14 indicate the cases where there is little distortion in signals.

The receiving device 120 receives signals of the A pattern 1411 or the B pattern 1412 from the transmitting device 110. With reference to the frame detection 1401, the receiving device 120 receives signals in the order of the A pattern 1411→the B pattern 1412→the A pattern 1411→the B pattern 1412→ . . . . A procedure for correction of the estimated phase direction performed by the receiving device 120 will be described below.

(Example of Correction of Estimated Phase Direction Performed by Receiving Device)

Figure 15:
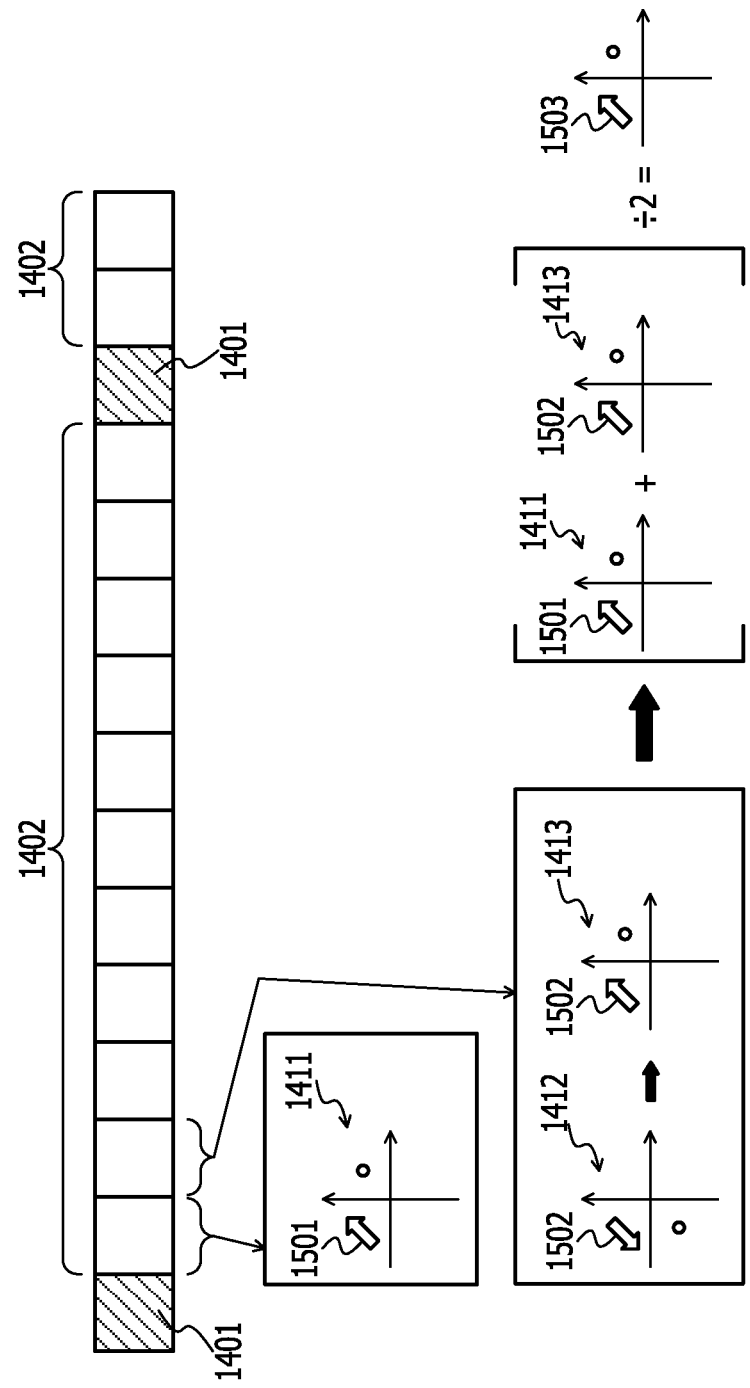
FIG. 15 is an explanatory representation illustrating an example of correction of an estimated phase direction performed by the receiving device.

FIG. 15 is an explanatory representation illustrating an example of correction of an estimated phase direction performed by the receiving device. Note that FIG. 15 illustrates the case where there is little distortion in signals, which corresponds to the case of FIG. 14. In FIG. 15, the receiving device 120 may, in response to the frame detection 1401, alternately detects the A pattern 1411 and the B pattern 1412.

The receiving device 120 calculates an estimated phase direction 1501 of the A pattern 1411 and an estimated phase direction 1502 of the B pattern 1412. Regarding the estimated phase directions 1501 and 1502 calculated, the receiving device 120 keeps the A pattern 1411 intact and causes the B pattern 1412 to be reversely rotated by 180 degrees.

Then, the receiving device 120 calculates the average of the estimated phase direction 1501 of the A pattern 1411 and the estimated phase direction 1502 of a reverse rotation pattern 1413 obtained by reversely rotating the B pattern 1412 to be able to obtain a corrected, estimated phase direction 1503. The average of the A pattern 1411 and the reversed pattern 1413 is determined, for example, by adding up the average coordinates of trajectory coordinates of both the A pattern 1411 and the reverse rotation pattern 1413 and then dividing the sum by two.

(Example of Correction of Estimated Phase Direction when Distorted in Specific Direction)

Figure 16:
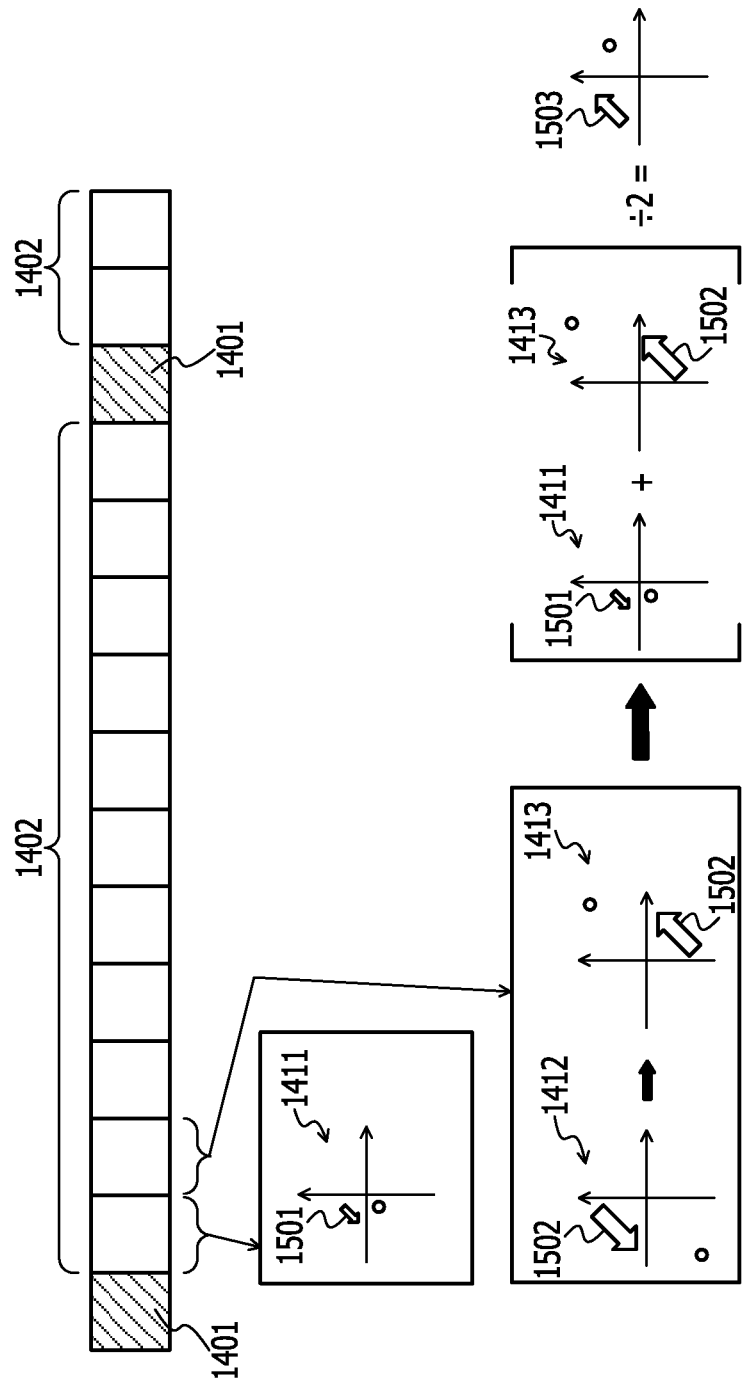
FIG. 16 is an explanatory representation illustrating an example of correction of an estimated phase direction when distorted in a specific direction.

FIG. 16 is an explanatory representation illustrating an example of correction of an estimated phase direction when distorted in a specific direction. The procedure of correction of an estimated phase direction illustrated in FIG. 16 is the same as the procedure of correction of the estimated phase direction illustrated in FIG. 15 in terms of procedure itself. The example illustrated in FIG. 16 differs in the estimated phase direction 1501 from the example illustrated in FIG. 15.

In FIG. 16, the A pattern 1411 demonstrates the case where although processing of setting the reference phase direction 1410 (refer to FIG. 14) as a direction of the first quadrant has been performed in the transmitting device 110, an estimated phase direction 1501 in the receiving device 120 is a direction of the third quadrant because of distortion. That is, the A pattern 1411 demonstrates the case where distortion occurs in a direction that cancels the direction of the estimated phase reference direction 1410.

In FIG. 16, the B pattern 1412 demonstrates the case where although the reference phase direction 1410 is set as a direction to a predetermined position of the third quadrant, an estimated phase direction 1502 in the receiving device 120 is a direction to a position farther apart from the origin than the predetermined position. That is, the B pattern 1412 demonstrates the case where distortion occurs in a direction for increasing the estimated phase reference direction 1410.

The receiving device 120 calculates the estimated phase direction 1501 of the A pattern 1411 and the estimated phase direction 1502 of the B pattern 1412. Regarding the estimated phase directions 1501 and 1502 calculated, the receiving device 120 keeps the A pattern 1411 intact and causes the B pattern 1412 to be reversely rotated by 180 degrees.

Then, the receiving device 120 calculates the average of the A pattern 1411 and the reverse rotation pattern 1413 obtained by reversely rotating the B pattern 1412 to be able to obtain a corrected, estimated phase direction 1503. In such a way, by averaging the A pattern 1411 and the reverse rotation pattern 1413 obtained by reversely rotating the B pattern 1412, the estimated phase direction 1503 in which an effect of distortion is cancelled and correction is made may be obtained. Accordingly, the phase may be estimated in consideration of distortion.

(Transmitting Process Performed by Transmitting Device when Number of Filter Stages are Changed)

Figure 17:
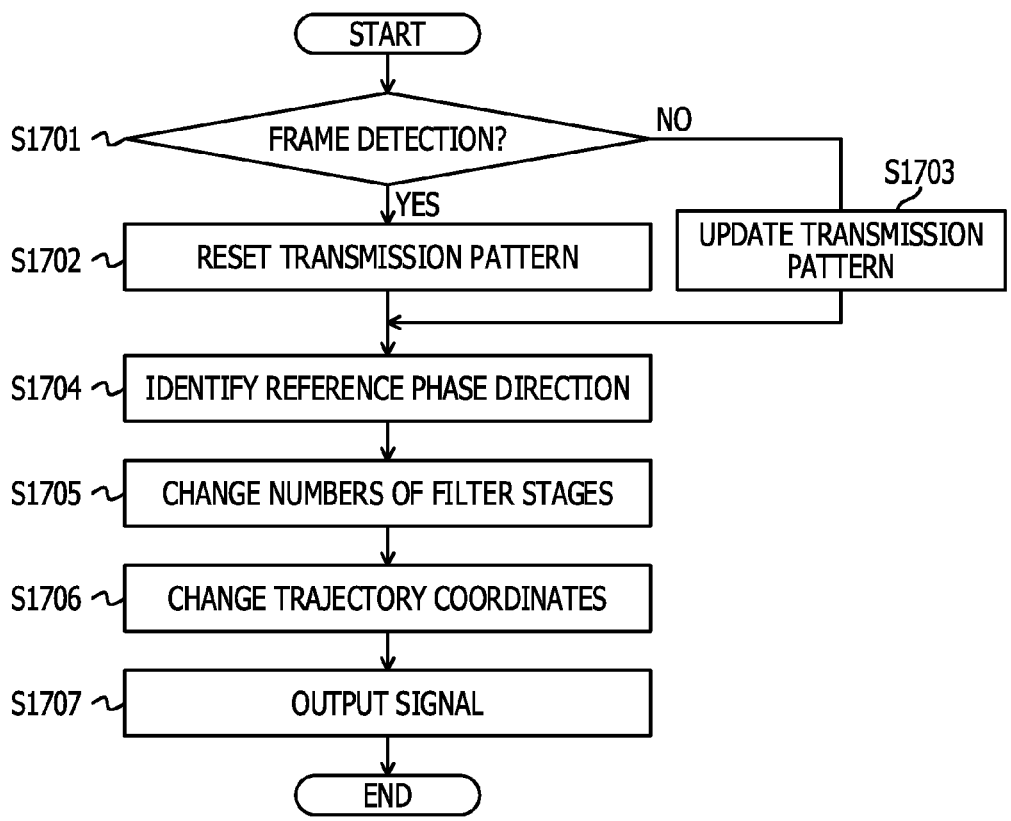
FIG. 17 is a flowchart illustrating an example of a transmission process performed by the transmitting device when the numbers of filter stages are changed.

FIG. 17 is a flowchart illustrating an example of a transmission process performed by the transmitting device when the numbers of filter stages are changed. As illustrated in FIG. 17, the transmitting device 110 determines whether or not frame detection has occurred (S1701). When frame detection has occurred (S1701: Yes), the transmitting device 110 resets a transmission pattern referred to (S1702), and the process proceeds to S1704. Resetting of a transmission pattern referred to is that the order of transmission patterns thereafter is set to the order of the A pattern 1411→the B pattern 1412→the A pattern 1411→ . . . , which is illustrated in FIG. 14.

When frame detection has not occurred (S1701: No), the transmitting device 110 updates the transmission pattern referred to (S1703). Updating of a transmission pattern referred to is that when the last transmission pattern is the A pattern 1411, the pattern is updated to the B pattern 1412, and when the last transmission pattern is the B pattern 1412, the pattern is updated to the A pattern 1411.

Then, the transmitting device 110 identifies a reference phase direction (either the A pattern 1411 or the B pattern 1412) in accordance with the number of bits from the portion of the frame detection 1401 (S1704). Then, the transmitting device 110 changes the numbers of filter stages of the Nyquist filters 801 and 802 to numbers of filter stages in accordance with the identified reference phase direction (S1705).

Next, the transmitting device 110 changes trajectory coordinates whose average coordinates are in a reference phase direction in accordance with the change in the numbers of filter stages (S1706). Then, the transmitting device 110 outputs a signal, which is based on symbol coordinates and the trajectory coordinates whose average coordinates have been changed to the reference phase direction, in order to transmit the signal to the receiving device 120 (S1707), and ends the transmitting process.

(Process of Correcting Estimated Phase Direction Performed by Receiving Device)

Figure 18:
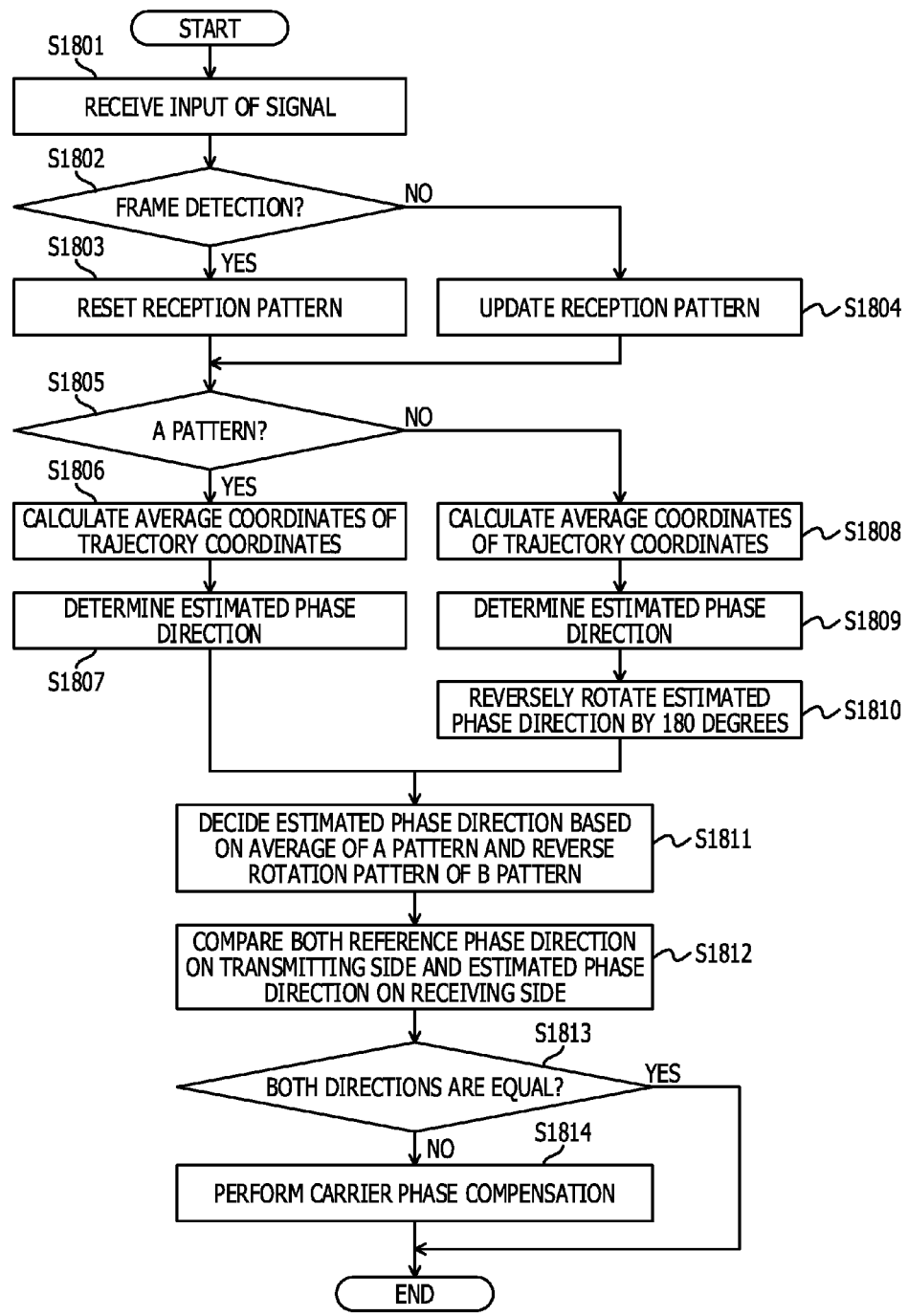
FIG. 18 is a flowchart illustrating an example of a process of correcting an estimated phase direction performed by the receiving device.

FIG. 18 is a flowchart illustrating an example of a process of correcting an estimated phase direction performed by the receiving device. As illustrated in FIG. 18, the receiving device 120 receives input of a signal from the transmitting device 110 (S1801). Then, the receiving device 120 determines whether or not frame detection has occurred (S1802). When frame detection has occurred (S1802: Yes), the receiving device 120 resets a reception pattern (S1803), and the process proceeds to S1805. Resetting of a reception pattern is that the order of reception patters thereafter is set to the order of the A pattern 1411 (refer to FIG. 15)→the B pattern 1412→the A pattern 1411→ . . . .

When frame detection has not occurred (S1802: No), the receiving device 120 updates the reception pattern (S1804). In S1804, when the last reception pattern is the A pattern 1411, the receiving device 120 updates the pattern to the B pattern 1412, and when the last reception pattern is the B pattern 1412, the receiving device 120 updates the pattern to the A pattern 1411.

Next, the receiving device 120 determines whether or not the received signal is in the A pattern 1411 (S1805). When the received signal is in the A pattern 1411 (S1805: Yes), the receiving device 120 calculates the average coordinates of trajectory coordinates between symbol coordinates (S1806). Then, the receiving device 120 determines the estimated phase direction based on a difference between the average coordinates of symbol coordinates and the average coordinates of trajectory coordinates (S1807), and the process proceeds to S1811.

When, in S1805, the determined pattern is not the A pattern 1411 (S1805: No), that is, the determined pattern is the B pattern 1412, the receiving device 120 calculates the average coordinates of trajectory coordinates of symbol coordinates (S1808). Then, the receiving device 120 determines the estimated phase direction based on a difference between the average coordinates of symbol coordinates and the average coordinates of trajectory coordinates (S1809). Next, the receiving device 120 reversely rotates the determined, estimated phase direction by 180 degrees (S1810).

Next, the receiving device 120 corrects the estimated phase direction based on the average of the A pattern 1411 and the reverse rotation pattern 1413 (refer to FIG. 15) obtained by reversely rotating the B pattern 1412 (S1811). Then, the receiving device 120 compares both the reference phase direction on the transmitting side and the estimated phase direction on the receiving side (S1812), and determines whether or not both the reference phase direction on the transmitting side and the estimated phase direction on the receiving side are equal (S1813).

When both the reference phase direction on the transmitting side and the estimated phase direction on the receiving side are equal (S1813: Yes), the receiving device 120 ends the receiving process. When the reference phase direction on the transmitting side and the estimated phase direction on the receiving side are not equal (S1813: No), the receiving device 120 performs carrier phase compensation (S1814) and ends the receiving process. In the carrier phase compensation, symbol coordinates are corrected so that the estimated phase direction on the receiving side coincides with the reference phase direction on the transmitting side.

In such a way, the receiving device 120 alternately selects the numbers of filer stages of the Nyquist filters 801 and 802 and corrects the estimated phase direction to the reference phase direction, thus being able to compensate for distortion of a signal. For example, even in the case where, as in the A pattern 1411 and the B pattern 1412 illustrated in FIG. 16, the estimated phase directions 1501 and 1502 of both patterns are in directions of the third quadrant, phase compensation may be performed in consideration of distortion.

According to this embodiment, a signal for which the average of trajectory coordinates between symbol coordinates is set to be different from the origin is transmitted, and the average of trajectory coordinates is estimated on the receiving side. For this reason, without a pilot signal included in transmission signals, it is possible to determine phase slip on the receiving side. Accordingly, it is possible to accurately estimate the phase while suppressing a decrease in the transmission capacity of data.

In addition, since the estimated phase direction is determined based on a difference between the average coordinates of symbol coordinates and the average coordinates of trajectory coordinates, it is possible to accurately estimate the phase if distortion is caused by an error or the like and thus the origin serving as a reference point of coordinates on the constellation is displaced.

In addition, alternately selecting the numbers of filter steps of the Nyquist filters 801 and 802 enables the estimated phase direction to be corrected to the reference phase direction. Thus, it is possible to remove distortion of a dynamic range and the like and thus to accurately estimate the phase.

While, in the above description, phase slip is estimated by identifying the estimated phase direction, estimation of phase slip is not limited to this. For example, phase slip may be estimated by calculating the average coordinates of a trajectory and identifying a quadrant having a maximum or minimum distance between the origin and the average coordinates of that quadrant among the distances between the origin and the average coordinates of all the quadrants. With such a structure, without a pilot signal included in transmission signals, phase slip may be determined on the receiving side. It is therefore possible to accurately estimate the phase while suppressing a decrease in the transmission capacity of data.

(Example in Case of Using Pilot Signal)

Here, description is given of a structure in which symbol coordinates are generated so that a symbol has a regular quadrilateral shape on the constellation, and phase slip is compensated for by using a pilot signal.

Figure 19:
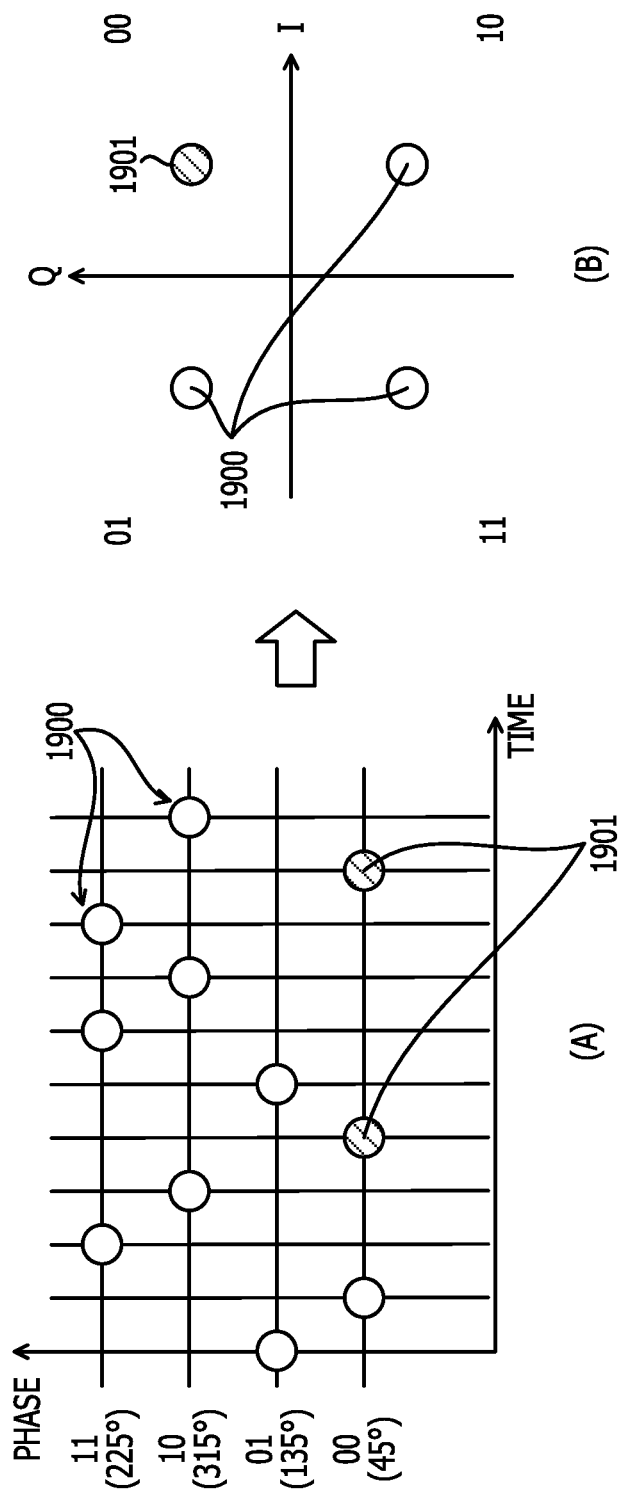
FIG. 19 is a diagram illustrating an example in the case of estimating a phase using a pilot signal.

FIG. 19 is a diagram illustrating an example in the case of estimating a phase using a pilot signal. In (A), the horizontal axis represents time and the vertical axis represents the phase. Each pair of symbol coordinates 1900 indicates any of 45, 135, 225, and 315 degrees, and is represented by two bits (quaternary). FIG. 19 illustrates that signals of 01, signals of 00, signals of 11, and signals of 10 are sequentially transmitted as time passes in (A).

The transmitting device 110 transmits pilot signals 1901 at a regular timing determined in advance, to the receiving device 120. The pilot signal 1901 is a signal indicating a phase serving as a reference. The regular timing at which the pilot signals are transmitted is also known on the side of the receiving device 120.

The transmitting device 110 transmits, for example, the pilot signal 1901 having a value (00=45 degrees) calculated with a period determined in advance. As illustrated in (B), the receiving device 120 may estimate the phases of a plurality of symbols 1900 with reference to this pilot signal.

Here, the pilot signal 1901 utilizes part of the time domain of a transmission rate. Consequently, increasing the percentage of the pilot signals 1901 leads to a proportional decrease in band usage efficiency, that is, a decrease in the transmission capacity of data. Decreasing the percentage of the pilot signals 1901 decreases reliability for detecting phase slip to increase the probability of occurrence of a burst error, which causes an error in data, to degrade signal quality.

In contrast, in this embodiment, it is possible to determine phase slip on the receiving side without using pilot signals leading to a decrease in the band usage efficiency. Thus, maximum use of the band may be achieved. It is therefore possible to accurately estimate the phase while suppressing a decrease in the transmission capacity of data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication system comprising:
 a transmitting device that transmits a signal based on pluralities of symbol coordinates on a constellation and pluralities of trajectory coordinates between respective ones of the pluralities of symbol coordinates, average coordinates of the pluralities of trajectory coordinates being different coordinates from coordinates of origin; and
 a receiving device that accumulates pluralities of trajectory coordinates between respective ones of the pluralities of symbol coordinates on the constellation in the signal received from the transmitting device, and estimates a phase of the signal received from the transmitting device based on a value representing a difference between average coordinates of the pluralities of trajectory coordinates accumulated and the different coordinates.

2. The communication system according to claim 1, wherein the value representing the difference is a value based on a result of comparison between the average coordinates of the pluralities of trajectory coordinates accumulated and the different coordinates.

3. The communication system according to claim 2,
wherein the receiving device accumulates the pluralities of symbol coordinates on the constellation for the signal received from the transmitting device, and
wherein the value representing the difference is a value based on a result obtained by correcting at least either of the average coordinates of the pluralities of trajectory coordinates accumulated and the different coordinates, based on average coordinates of the pluralities of symbol coordinates accumulated, and comparing the average coordinates of the pluralities of trajectory coordinates accumulated and the different coordinates the at least either of which has been corrected.

4. The communication system according to claim 1, wherein the value representing the difference is a value based on a result of comparison of average coordinates for each given region of the pluralities of trajectory coordinates accumulated.

5. The communication system according to claim 1,
wherein the transmitting device transmits a first signal based on a first trajectory coordinate group, the first trajectory coordinate group being pluralities of trajectory coordinates whose average coordinates on the constellation are first coordinates different from the origin, and a second signal based on a second trajectory coordinate group whose average coordinates on the constellation are second coordinates different from the origin and the first coordinates, while performing switching between the first signal and the second signal, and
wherein the value representing the difference is a value based on a third trajectory coordinate group between respective ones of pluralities of symbol coordinates in the first signal received from the transmitting device, a fourth trajectory coordinate group between respective ones of pluralities of symbol coordinates in the second signal received from the transmitting device, and a difference between the first coordinates and the second coordinates.

6. The communication system according to claim 5, wherein the value representing a difference is a value representing a difference between average coordinates of the third trajectory coordinate group and the fourth trajectory coordinate group at least either of which is corrected based on the difference between the first coordinates and the second coordinates.

7. The communication system according to claim 1, wherein the signal is a signal produced by modulation including at least phase modulation.

8. A receiving device comprising:
a reception circuitry configured to receive a signal from a transmitting device that transmits the signal based on pluralities of symbol coordinates on a constellation and pluralities of trajectory coordinates between respective ones of the pluralities of symbol coordinates, average coordinates of the trajectory coordinates being different coordinates from coordinates of origin;
an accumulation circuitry configured to accumulate, for the signal received by the reception circuitry, pluralities of trajectory coordinates between respective ones of pluralities of symbol coordinates on the constellation; and
an estimation circuitry configured to estimate a phase of the signal received from the transmitting device, based on a value representing a difference between average coordinates of the pluralities of trajectory coordinates accumulated by the accumulation circuitry and the different coordinates.

9. A semiconductor device comprising:
an accumulation circuitry configured to accumulate, for a signal transmitted from a transmitting device that transmits a signal based on pluralities of symbol coordinates on a constellation and pluralities of trajectory coordinates between respective ones of the pluralities of symbol coordinates, average coordinates of the pluralities of symbol coordinates being different coordinates from coordinates of origin, and received by a receiving device, pluralities of trajectory coordinates between respective ones of pluralities of symbol coordinates on the constellation; and
an estimation circuitry configured to estimate a phase of the signal received from the transmitting device, based on a value representing a difference between average coordinates of the pluralities of trajectory coordinates accumulated by the accumulation circuitry and the different coordinates.

* * * * *